US012175348B2

(12) United States Patent
Lee et al.

(10) Patent No.: US 12,175,348 B2
(45) Date of Patent: Dec. 24, 2024

(54) METHOD AND APPARATUS FOR MANAGING VEHICLE'S RESOURCE IN AUTONOMOUS DRIVING SYSTEM

(71) Applicant: LG ELECTRONICS INC., Seoul (KR)

(72) Inventors: Dongkyu Lee, Seoul (KR); Namyong Park, Seoul (KR); Eunkoo Lee, Seoul (KR); Chulhee Lee, Seoul (KR); Taesuk Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 17/039,476

(22) Filed: Sep. 30, 2020

(65) Prior Publication Data
US 2021/0123757 A1 Apr. 29, 2021

(30) Foreign Application Priority Data
Oct. 24, 2019 (KR) .......................... 1020190133140

(51) Int. Cl.
*G06N 3/02* (2006.01)
*B60W 50/08* (2020.01)
*G01C 21/26* (2006.01)
*B60W 50/00* (2006.01)

(52) U.S. Cl.
CPC .............. *G06N 3/02* (2013.01); *B60W 50/082* (2013.01); *G01C 21/26* (2013.01); *B60W 2050/0005* (2013.01)

(58) Field of Classification Search
None
See application file for complete search history.

(56) References Cited

U.S. PATENT DOCUMENTS

| 11,356,536 B2* | 6/2022 | Heiser ..................... H04L 67/34 |
| 2018/0120117 A1* | 5/2018 | Grein .................... G01C 21/343 |
| 2018/0120839 A1* | 5/2018 | Hasberg ............... B60W 50/08 |
| 2019/0186947 A1* | 6/2019 | Rockmore ............. B60K 35/29 |
| 2019/0324466 A1* | 10/2019 | Dean ..................... G05D 1/0278 |
| 2019/0324475 A1* | 10/2019 | Dean .................. G01C 21/3469 |
| 2019/0377342 A1* | 12/2019 | Panzica .................... G08G 1/20 |
| 2020/0076781 A1* | 3/2020 | Edwards ............. H04W 12/009 |
| 2020/0116515 A1* | 4/2020 | Chadha .............. G01C 21/3453 |
| 2020/0159214 A1* | 5/2020 | Misu ...................... G06V 10/82 |
| 2020/0186622 A1* | 6/2020 | Kim ........................ H04L 67/12 |
| 2020/0409362 A1* | 12/2020 | Long ..................... B60W 50/14 |
| 2021/0089026 A1* | 3/2021 | Bender ................. H04W 4/024 |

(Continued)

*Primary Examiner* — Amelia Vorce
(74) *Attorney, Agent, or Firm* — Fish & Richardson P.C.

(57) ABSTRACT

A method for managing a vehicle's resource includes: executing at least one application requiring a resource in a first mode, the at least one application associated with autonomous driving process of the vehicle, obtaining driving route information, obtaining, from a position data generation device disposed at the vehicle, location information providing a current location of the vehicle, predicting resource utilization expected to be required in the first mode by using the driving route information and the location information, and switching from the first mode executing the at least one application to a second mode, wherein the at least one application is executed in the second mode requiring less resources than being executed in the first mode based on the predicted resource utilization exceeding a first threshold.

25 Claims, 19 Drawing Sheets

(56) References Cited

U.S. PATENT DOCUMENTS

2021/0105339 A1\* 4/2021 Heiser ................. B60W 60/001
2021/0107566 A1\* 4/2021 Seegmiller ......... G01C 21/3626
2022/0303331 A1\* 9/2022 Svennebring ...... H04N 21/8456

\* cited by examiner

FIG. 20
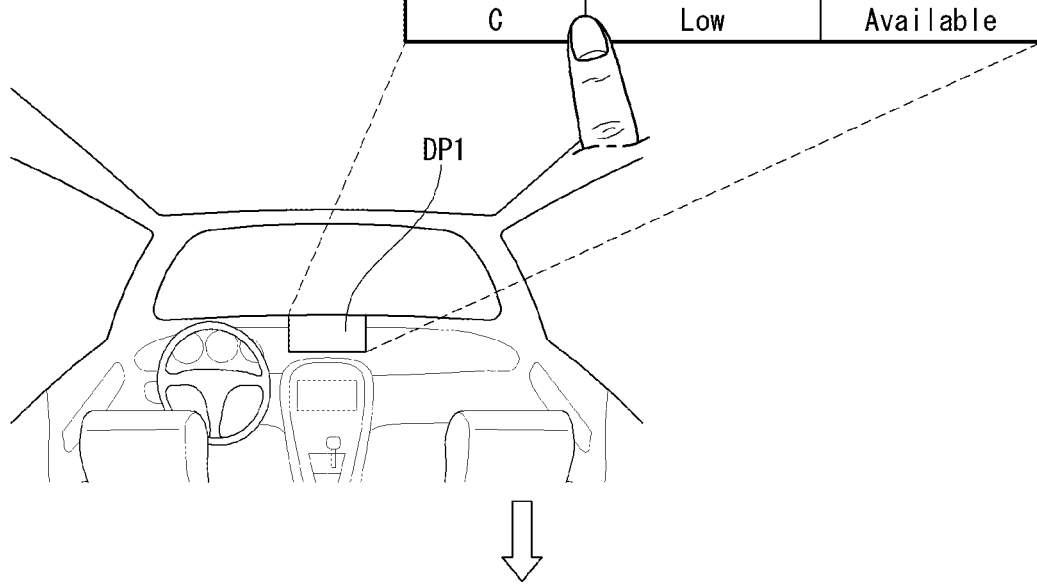
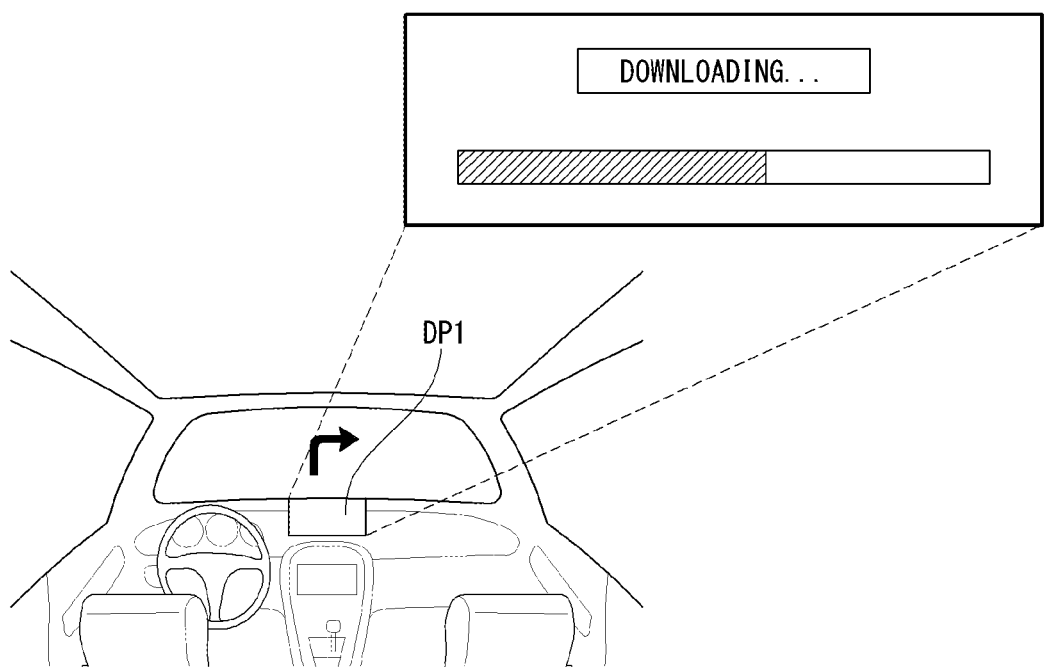

METHOD AND APPARATUS FOR MANAGING VEHICLE'S RESOURCE IN AUTONOMOUS DRIVING SYSTEM

CROSS-REFERENCE TO RELATED APPLICATION

This application claims the benefit of Korean Patent Application No. 10-2019-0133140, filed on Oct. 24, 2019, the entire disclosure of which are hereby incorporated by reference herein for all purposes.

BACKGROUND OF THE INVENTION

Field of the Invention

The present disclosure relates to a method and an apparatus for managing a vehicle's resource, and more specifically, to a method and an apparatus for managing a vehicle's resource capable of changing an application according to resource utilization.

Description of the Related Art

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and Autonomous Driving Systems refer to systems that monitor and control the autonomous vehicle such that the autonomous vehicle can perform self-driving.

When the vehicle is traveling in an autonomous driving mode, the type and performance of the service that the vehicle must provide may differ depending on a location of the vehicle, a vehicle surrounding situation including surrounding objects, etc., a passenger in the vehicle, and a taste of the passenger.

In addition, when a specific event occurs, the vehicle needs to dynamically change an application and/or an application currently being used in response to the specific event.

SUMMARY OF THE INVENTION

The present disclosure aims to address the above-described needs and/or problems.

In addition, an object of the present disclosure is to implement a method and an apparatus for managing a vehicle's resource that predicts resource utilization according to a driving route of the vehicle.

In addition, an object of the present disclosure is to implement a method and an apparatus for managing a vehicle's resource that changes an application when it is determined that the application change is necessary according to the predicted resource utilization.

A method for managing a vehicle's resource according to an embodiment of the present disclosure includes executing at least one application that requires a resource during autonomous driving in a first mode; obtaining driving route information; applying the driving route information to an artificial neural network (ANN) model, and predicting the resource utilization needed in an autonomous driving process from an output value of the artificial neural network model; and switching from the first mode of the at least one application to a second mode, wherein the at least one application is executed in the second mode requiring less resources than the first mode based on the predicted resource utilization exceeds a first threshold.

In addition, the predicting resource utilization may include inputting the driving route information into the artificial neural network model; and predicting resource utilization related to the output value of the artificial neural network model.

In addition, the inputting the driving route information into the artificial neural network model may include extracting a feature from the driving route information; and inputting the extracted feature into the artificial neural network model.

In addition, the feature may include a vector extracted from the driving route information based on a pre-trained embedding model, wherein the embedding model is configured to vectorize the driving route information to an embedding vector related to the driving route information.

In addition, the method may further include controlling an execution mode of the application so that the application is executed in a third mode requiring more resources than the first mode based on the predicted resource utilization decreases below a second threshold.

In addition, the first threshold may be the same value as the second threshold.

In addition, the driving route information may include at least one of a driving route to a destination, execution mode information of the application used in an autonomous driving process, a uniformity of a road surface located on the driving route, a curvature of a road, a number of surrounding objects, or a type of the surrounding objects.

In addition, the method may further include a passenger's application usage history as learning data of the artificial neural network model.

In addition, the method may further include requesting update information for other execution mode from an external server based on no information for the other execution mode for switching execution mode of the at least one application.

In addition, the resource utilization may be mapped onto each location information for a driving route, and related to the location information.

An apparatus for managing a vehicle's resource according to an embodiment of the present disclosure includes a transceiver for receiving driving route information of the vehicle; a memory; and a processor configured to: execute at least one application that requires a resource during autonomous driving in a first mode; predict resource utilization expected to be required in the first mode by using the driving route information; and switch from the first mode of the at least one application to a second mode, wherein the at least one application is executed in the second mode requiring less resources than the first mode based on the predicted resource utilization exceeds a first threshold using the driving route information to an artificial neural network (ANN) model.

Effects of the method and apparatus for managing a vehicle's resource according to an embodiment of the present disclosure will be described as follows.

The present disclosure may predict the resource utilization according to the driving route of the vehicle.

In addition, the present disclosure may change an application when it is determined that the application change is necessary according to the predicted resource utilization.

The effects obtained in the present disclosure are not limited to the above-mentioned effects, and other effects not mentioned will be clearly understood by those skilled in the art from the following description.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIGS. 19 and 20 are diagrams illustrating a process of selecting any one of a plurality of applications and downloading and installing it.

DETAILED DESCRIPTION OF THE EMBODIMENTS

Figure 1:
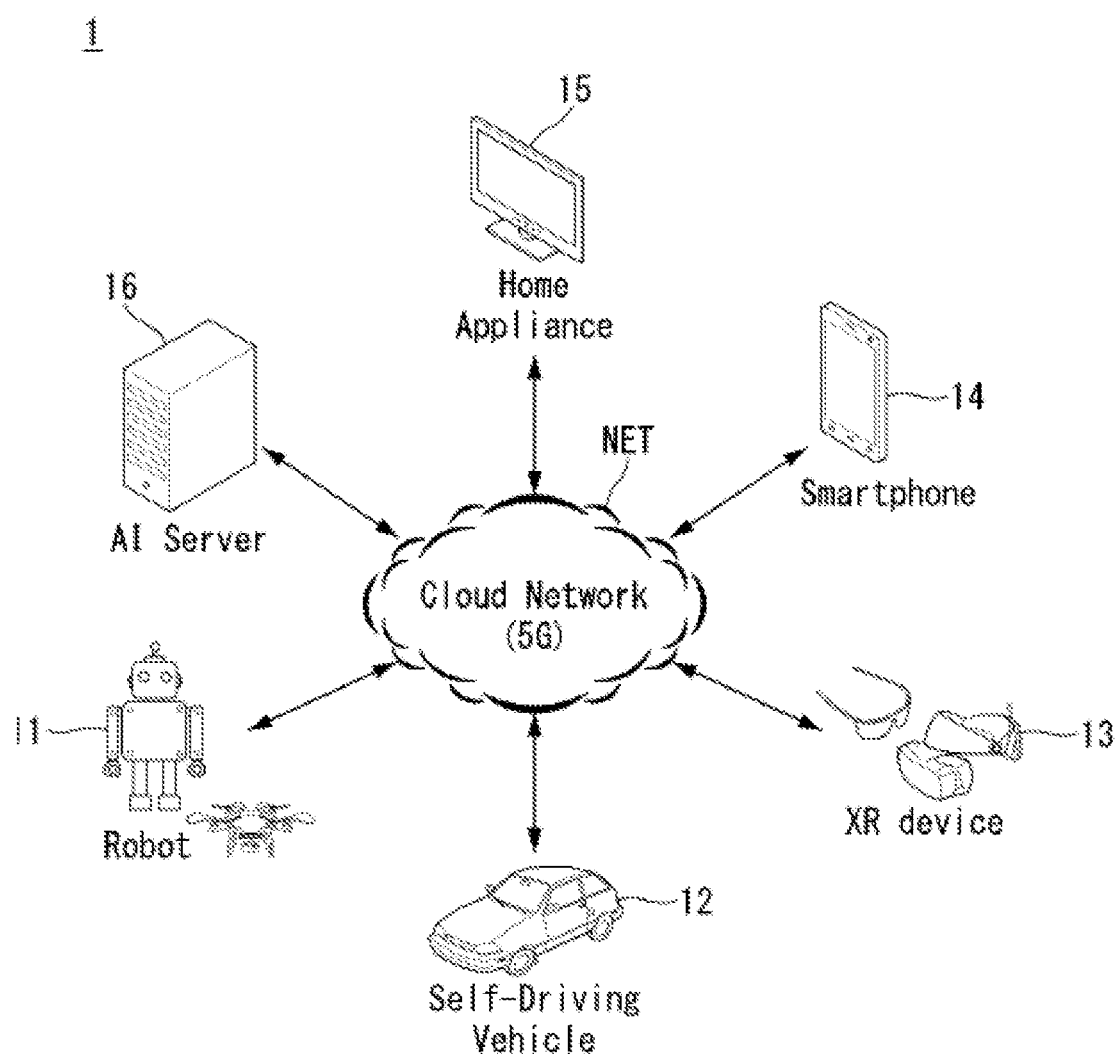
FIG. 1 illustrates one embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

[5G Senario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network NET. Here, the robot 11, self-driving vehicle 12, XR device 13, smartphone 14, or home appliance 15 to which the AI technology has been applied may be referred to as an AI device (11 to 15).

The cloud network NET may comprise part of the cloud computing infrastructure or refer to a network existing in the cloud computing infrastructure. Here, the cloud network NET may be constructed by using the 3G network, 4G or Long Term Evolution (LTE) network, or 5G network.

In other words, individual devices (11 to 16) constituting the AI system may be connected to each other through the cloud network NET. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network NET and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 11 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

A. Example of Block Diagram of UE and 5G Network

Figure 2:
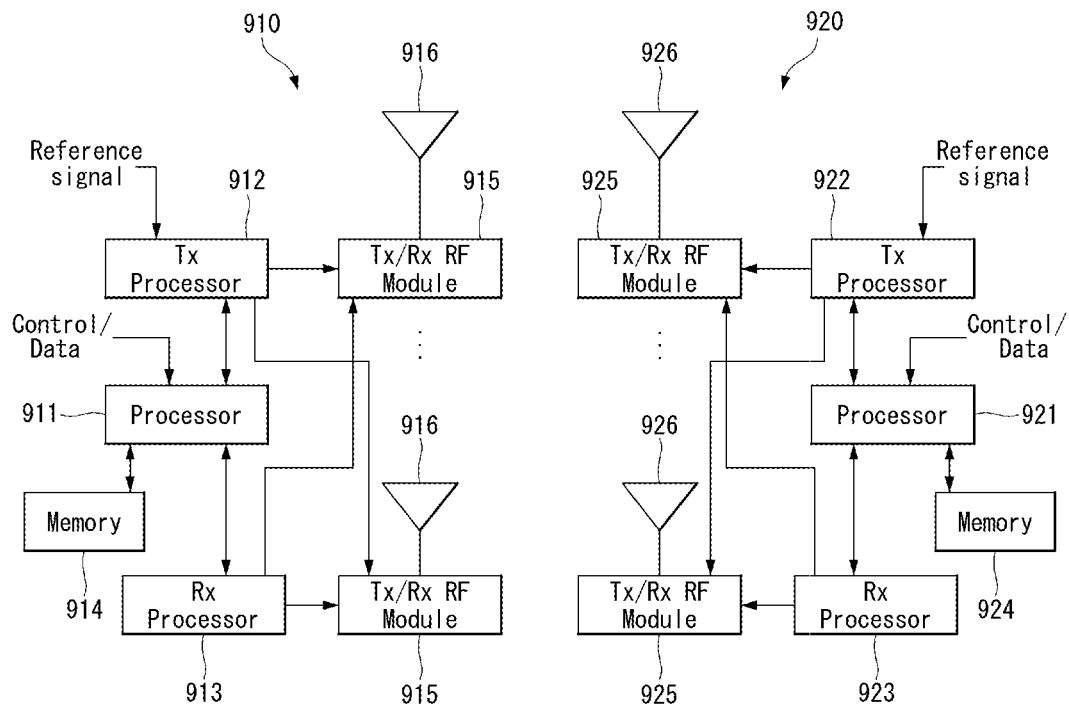
FIG. 2 is a block diagram of a wireless communication system to which methods proposed in the disclosure are applicable.

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
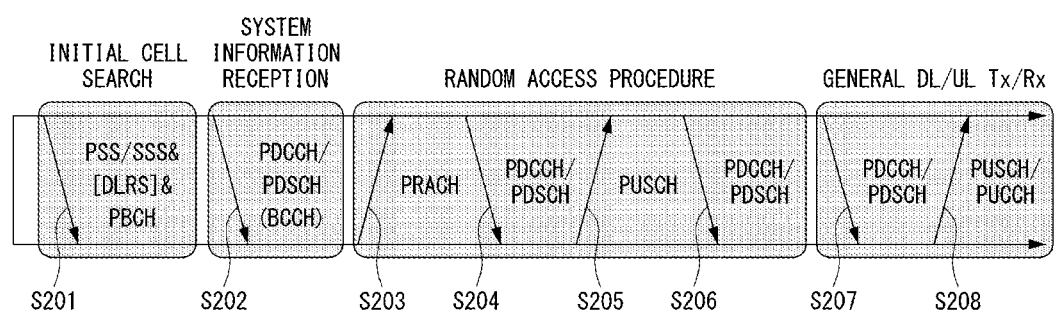
FIG. 3 is a diagram showing an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 4:
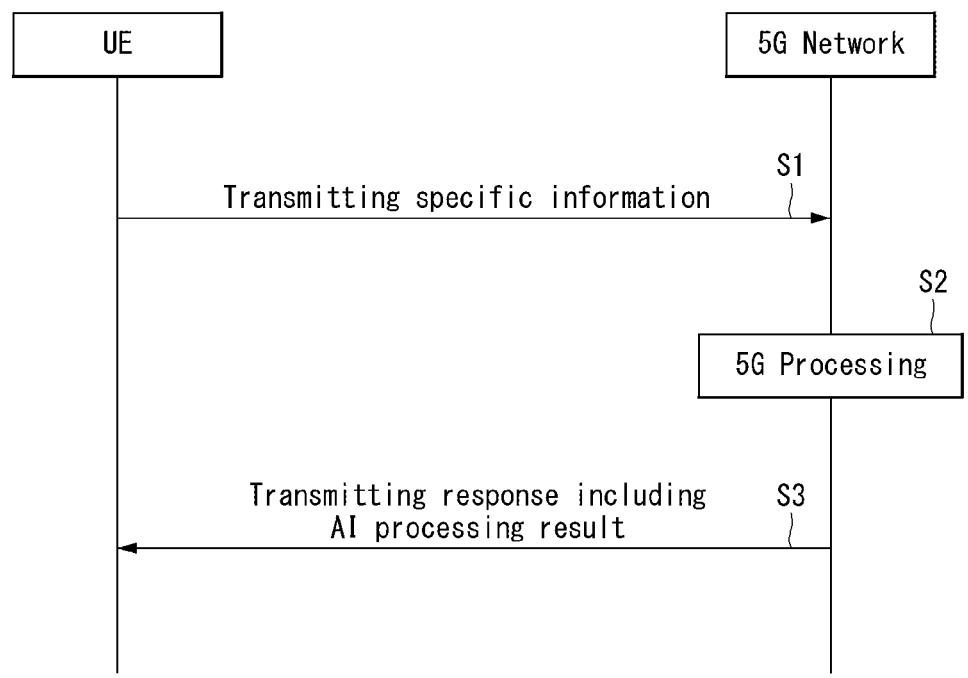
FIG. 4 shows an example of basic operations of an autonomous vehicle and a 5G network in a 5G communication system.

FIG. 4 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the autonomous vehicle performs an initial access procedure and a random access procedure with the 5G network prior to step S1 of FIG. 4 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

Figure 5:
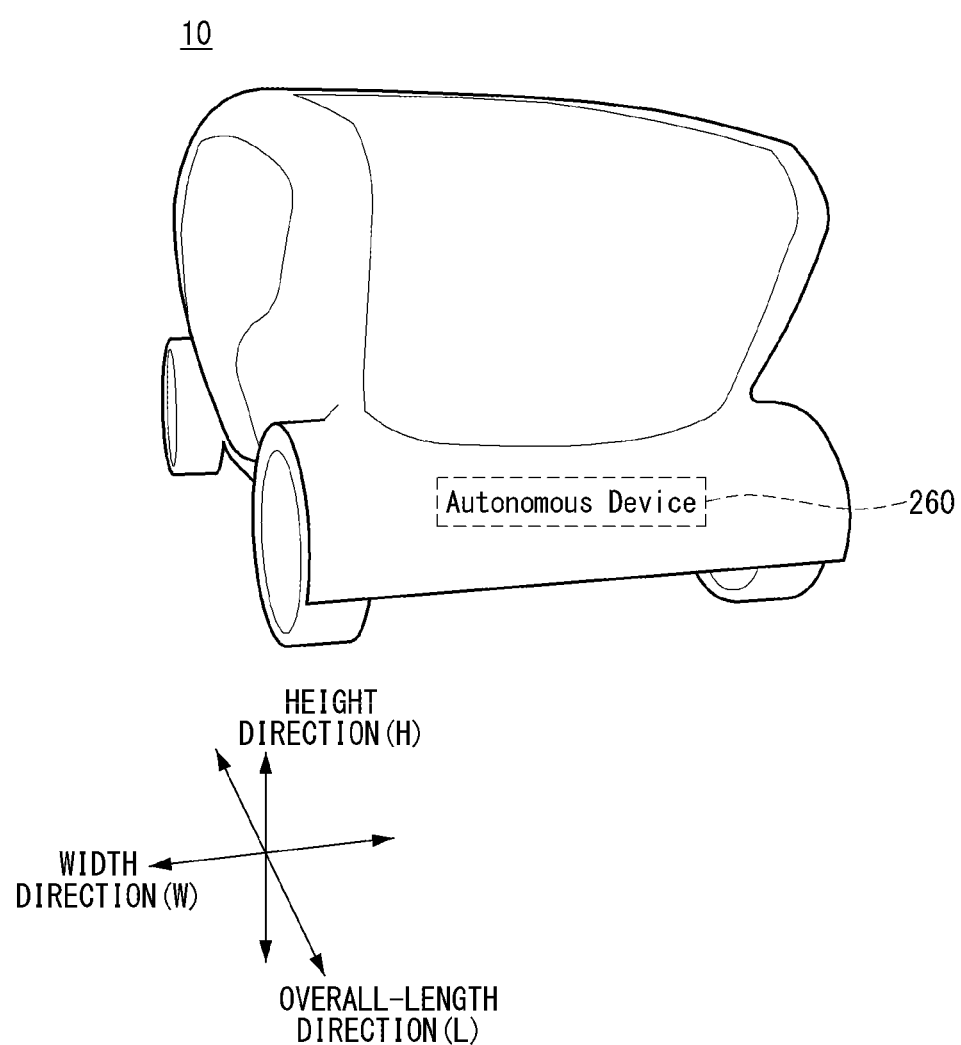
FIG. 5 is a diagram showing a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 6:
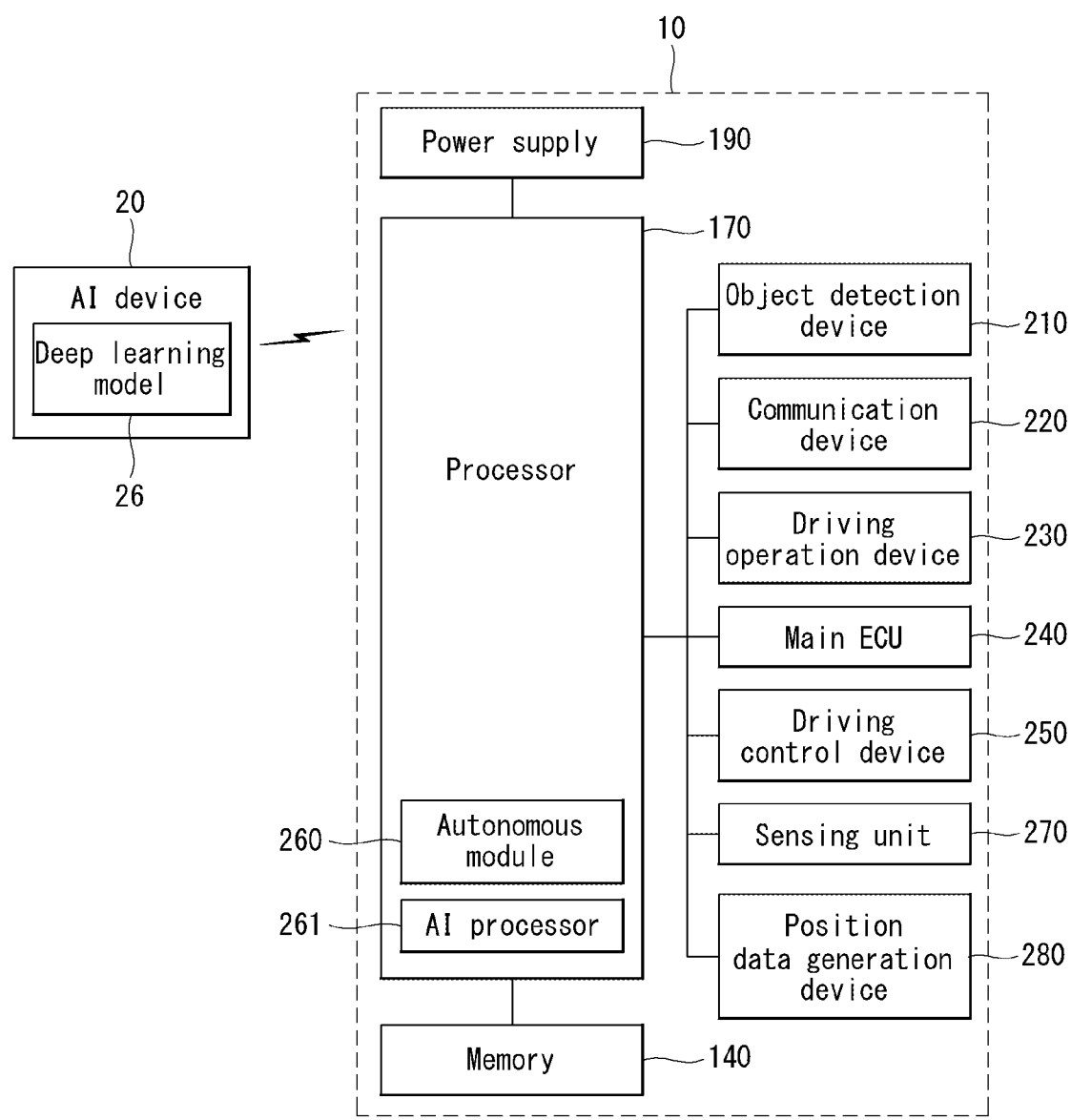
FIG. 6 is a control block diagram of the vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

Figure 7:
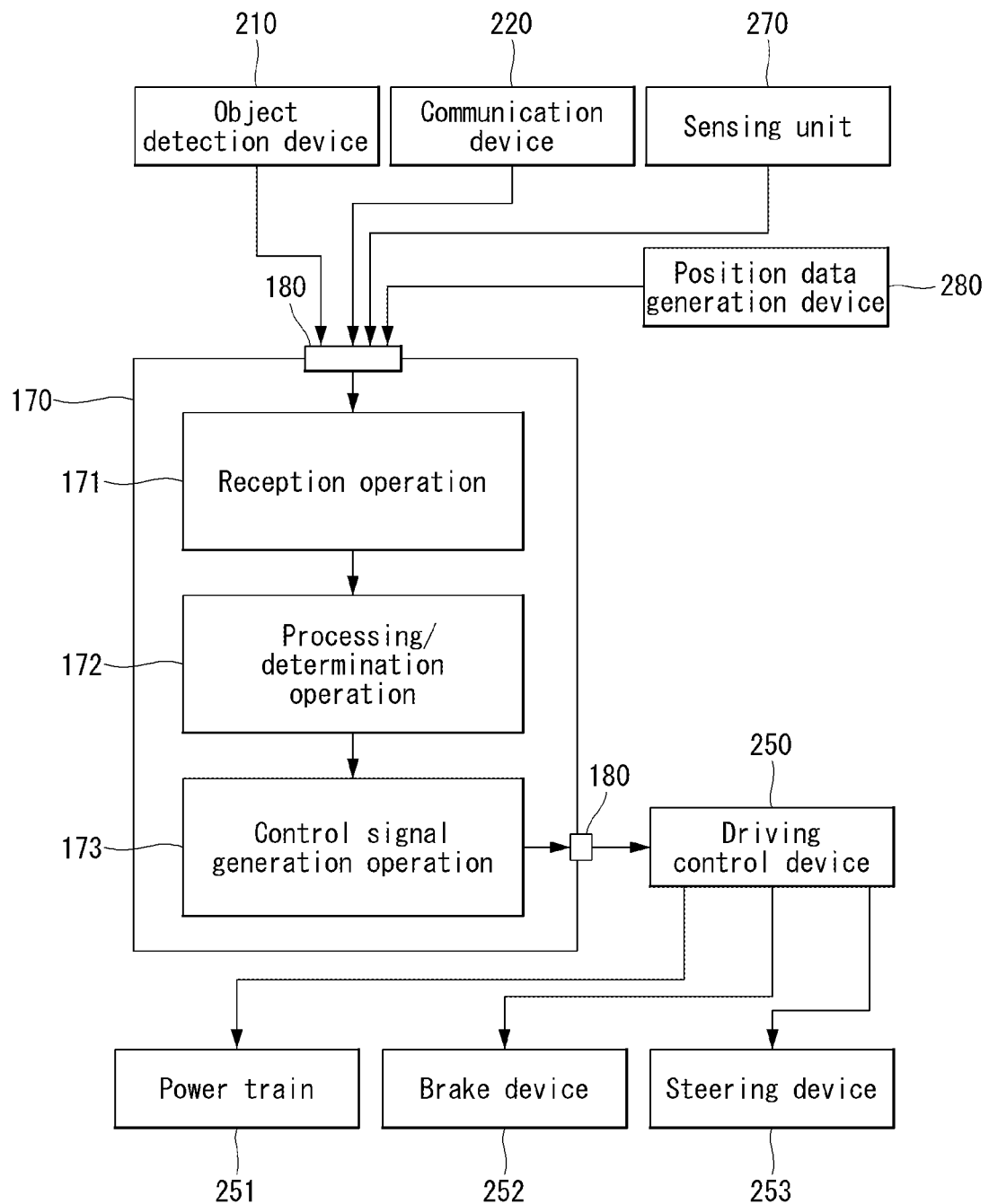
FIG. 7 is a diagram showing a signal flow in an autonomous vehicle according to an embodiment of the present disclosure.

FIG. 7 is a diagram showing a signal flow in an autonomous vehicle according to an embodiment of the present disclosure.

1) Reception Operation

Referring to FIG. 7, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 253.

Figure 8:
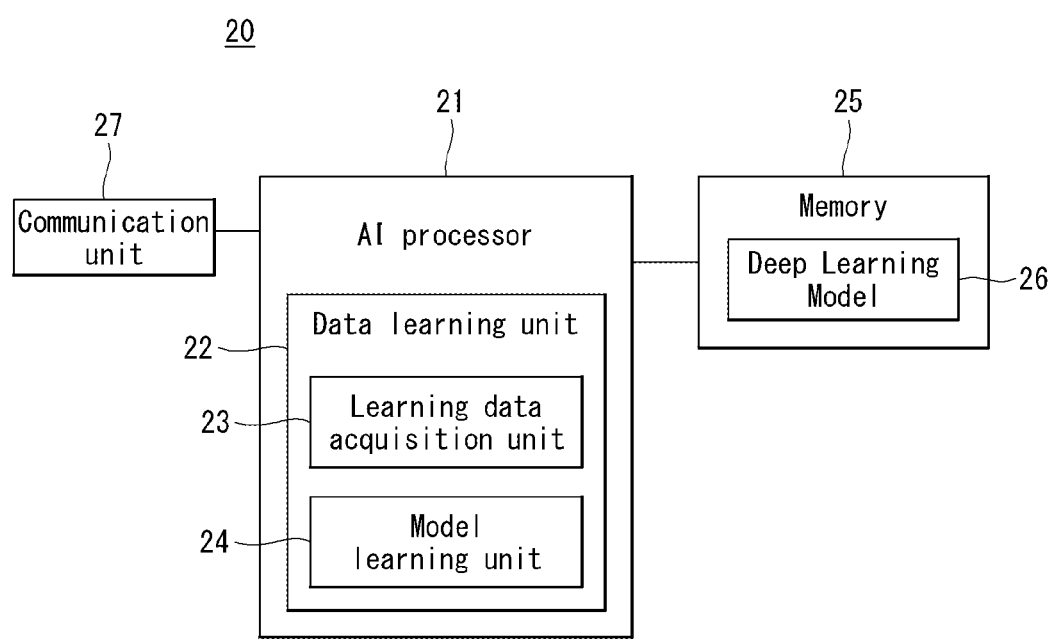
FIG. 8 is a block diagram illustrating an AI device.

FIG. 8 is a block diagram illustrating an AI device.

The AI device 20 may include an electronic device including an AI module capable of performing AI processing or a server including the AI module. In addition, the AI device 20 may be included in at least a part of the intelligent service providing apparatus 100 illustrated in FIG. 34 and may be provided to perform at least some of the AI processing together.

The AI processing may include all operations related to the control of the intelligent service providing apparatus 100 illustrated in FIG. 34. For example, the intelligent service providing apparatus 100 may AI process the sensing data or the acquired data to perform processing/determination and control signal generation. In addition, for example, the intelligent service providing apparatus 100 may AI process the data received through the communication unit to perform control of the intelligent electronic device.

The AI device 20 may be a client device that directly uses the AI processing result or may be a device in a cloud environment that provides the AI processing result to another device.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25. In particular, the AI processor 21 may learn a neural network for obtaining estimated noise information by analyzing the operating state of each speech providing device. In this case, the neural network for outputting estimated noise information may be designed to simulate the human's brain structure on a computer, and may include a plurality of network nodes having weight and simulating the neurons of the human's neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, speech providing, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data learning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquisition unit 23 and a model learning unit 24.

The learning data acquisition unit 23 may obtain training data for a neural network model for classifying and recognizing data. For example, the learning data acquisition unit 23 may obtain an operating state to be input to the neural network model and/or a feature value, extracted from the operating state, as the training data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning unit 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The training data preprocessor may pre-process an obtained operating state so that the obtained operating state may be used for training for recognizing estimated noise information. For example, the training data preprocessor may process an obtained operating state in a preset format so that the model learning unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model learning unit 24. For example, the training data selection unit may select only data for a syllable, included in a specific region, as training data by detecting the specific region in the feature values of an operating state obtained by the speech providing device IV.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the data learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an intelligent vehicle (IV). Further, the AI device 20 may be defined as another intelligent vehicle (IV) or a 5G network that communicates with the above intelligent vehicle (IV). Meanwhile, the AI device 20 may be implemented by being functionally embedded in a controller included in an intelligent vehicle (IV).

Meanwhile, the AI device 20 shown in FIG. 8 was functionally separately described into the AI processor 21, the memory 25, the communication unit 27, etc., but it should be noted that the aforementioned components may be integrated in one module and referred to as an AI module.

FIGS. 9A to 11 are diagrams illustrating an example of factors influencing a vehicle's resource.

Figure 9A:
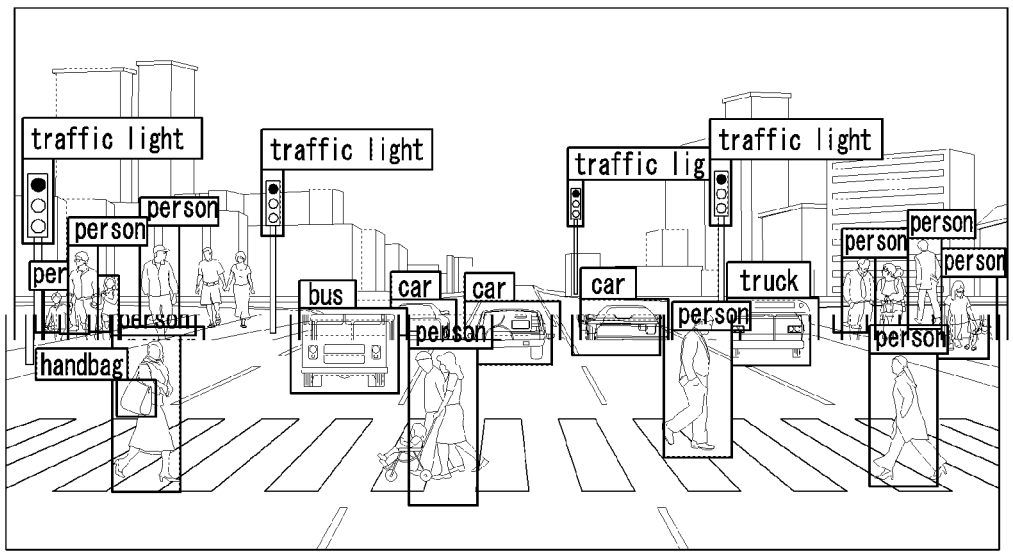
FIGS. 9A to 11 are diagrams illustrating an example of factors influencing a vehicle's resource.
Figure 9B:
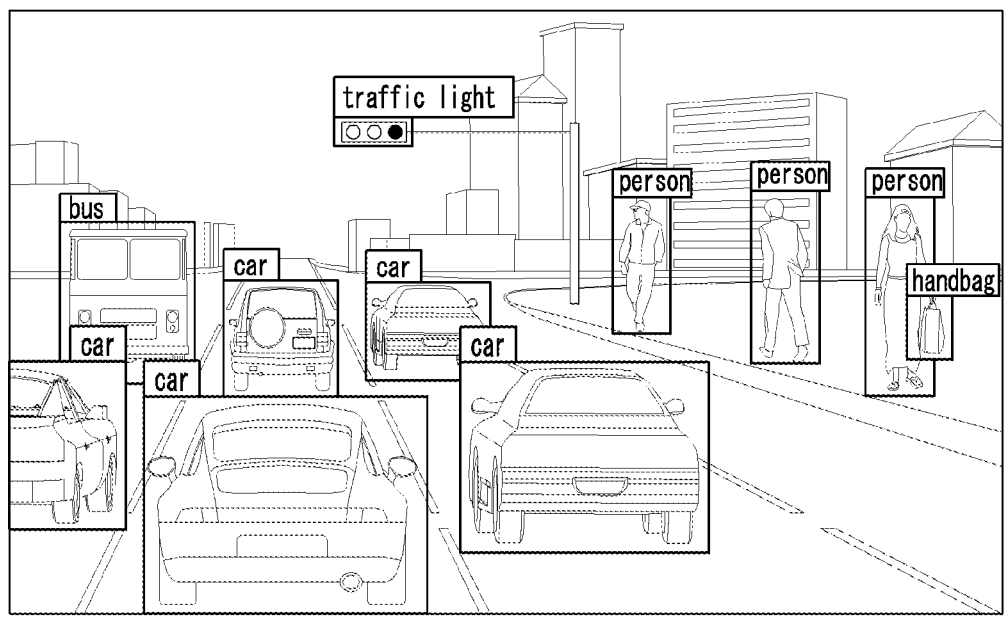

A resource refers to a resource that the vehicle 10 uses to utilize a specific application or module. Resource utilization refers to a ratio of resources currently used by the vehicle comparing to the allowable resource for the vehicle 10. The resource may include CPU, GPU, or memory, etc. The resource utilization of the vehicle 10 may vary depending on the number, types, and states of surrounding objects. Referring to FIGS. 9A and 9B, FIG. 9A includes traffic lights, persons, cars, a truck, a handbag, and the like. FIG. 9B includes a traffic light, persons, a handbag, a bus and the like.

The autonomous vehicle 10 consumes a lot of resources to detect the surrounding objects in order to prevent collision with the surrounding objects or to interact with the surrounding objects in performing an autonomous driving process. The resources may increase as the number of the surrounding objects increases.

In addition, the resource may vary depending on the types of the surrounding object. The surrounding objects include movable objects and still objects. The movable objects may include the person, car, bus, truck, and so on. The still objects may include the traffic light, tree, and so on. Unlike the still objects, the movable objects need to determine the driving process of the vehicle 10 based on the moving speed, the moving direction, etc. of the movable objects, so that resource usage may increase. That is, even if the number of objects is larger based on the image generated by the camera provided in the vehicle 10, if the ratio of the movable objects among objects included in the image is high, even if the number of objects is relatively small, the resource usage may be high.

The state of the object may include a state of the traffic light, whether or not the vehicle 10 stops. For example, when the traffic light is a RED signal, the vehicle 10 will stop at the corresponding location, so that resources required for driving may decrease. For another example, the resource usage may increase or decrease depending on a driving speed, a driving direction of a vehicle being ahead, whether the vehicle being ahead is stopped or the like.

Figure 10:
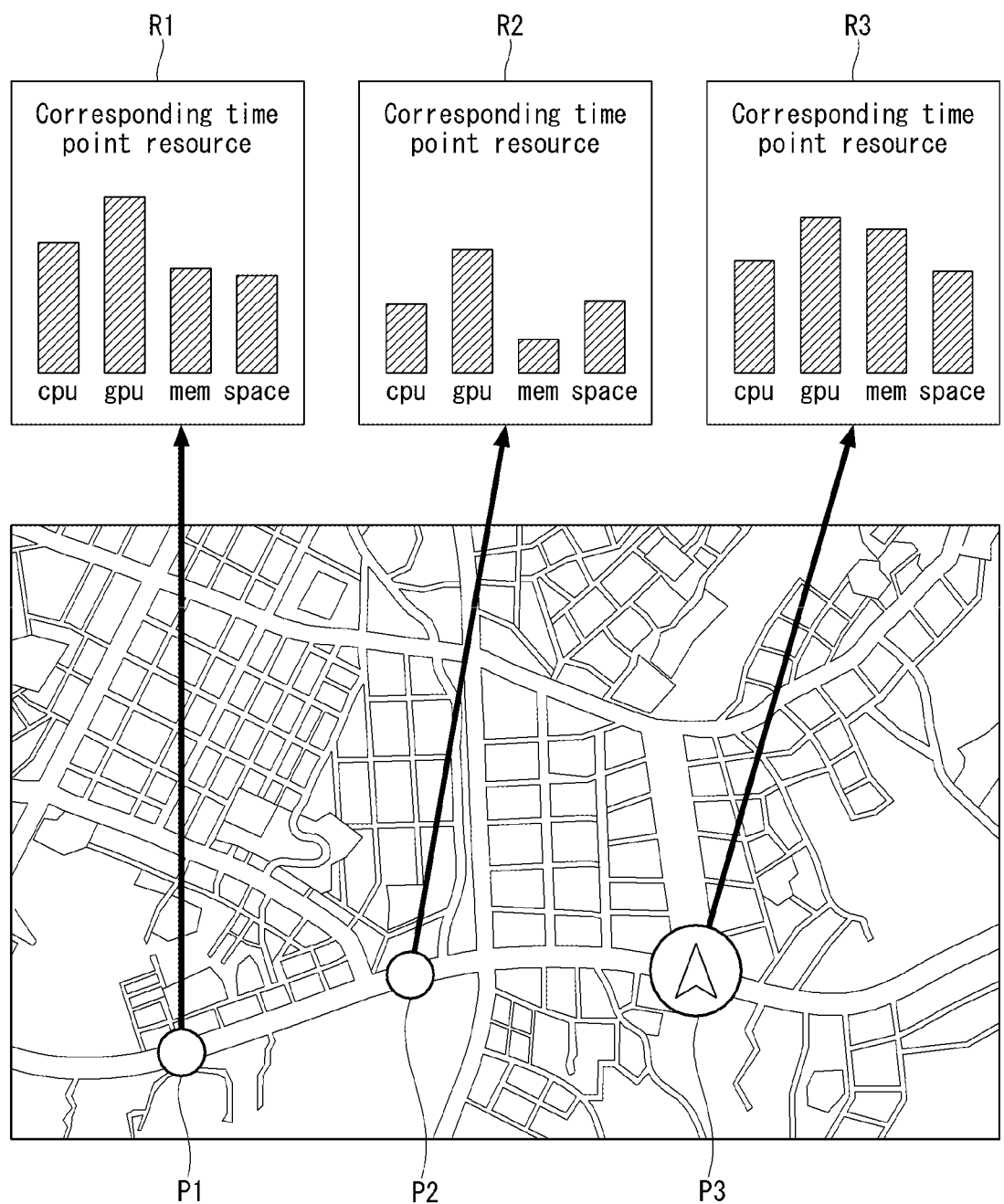

Referring to FIG. 10, resources R1, R2, and R3 used by the vehicle 10 may be different according to points P1 to P3 on a map. The vehicle 10 has the resources of R1 to R3 at the points P1 to P3, respectively. At this time, corresponding time point resources illustrated in FIG. 10 represent resource utilization R1, R2, and R3 in a specific region. As such, the resource utilization R1, R2, and R3 of the vehicle 10 may vary depending on the surrounding environment. For example, the resource utilization R1, R2, and R3 may vary depending on the density of the vehicle at the location on the map and the number of surrounding objects.

In a learning step of an artificial neural network model according to an embodiment of the present disclosure, the processor (21 of FIG. 8) may store resource utilization R1, R2, and R3 in a specific region obtained while driving the vehicle 10 in a memory, and may learn the artificial neural network model by setting the resource utilization R1, R2, and R3 as labels corresponding to outputs of learning data.

Figure 11:
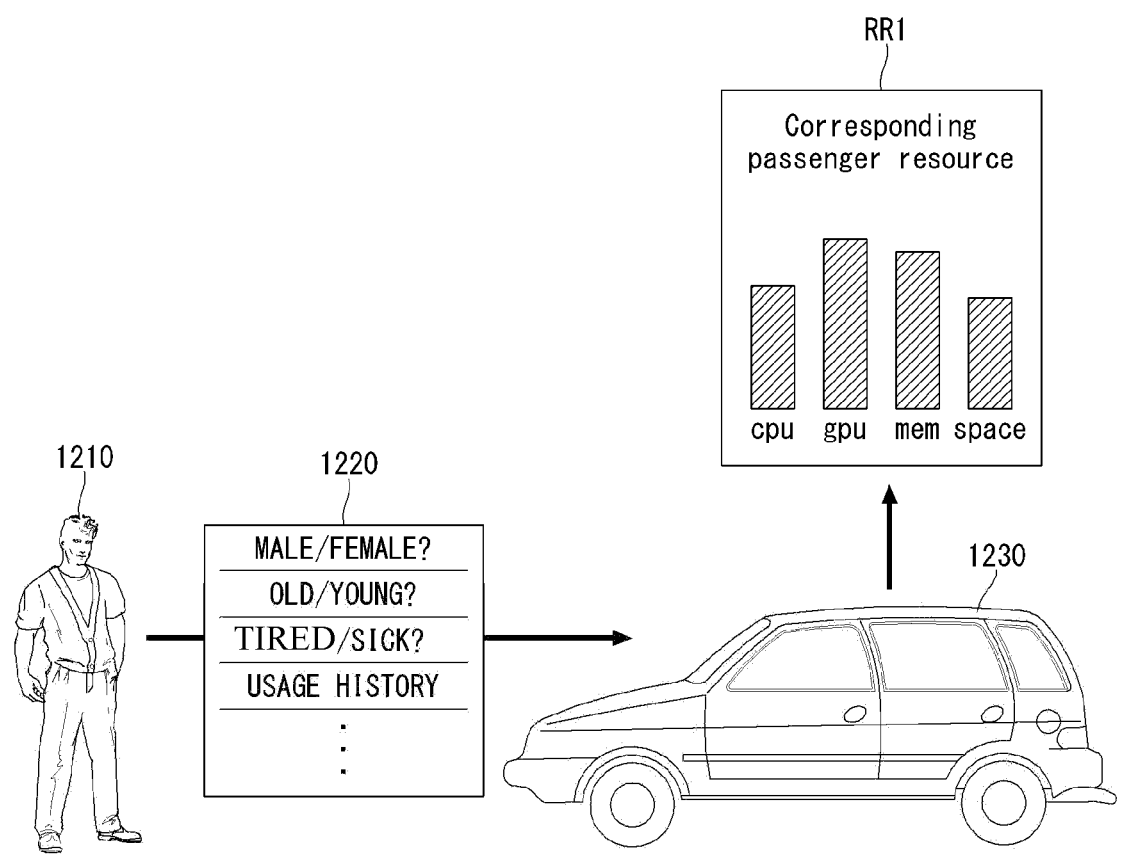

Referring to FIG. 11, the processor 261 may predict resource utilization of the vehicle 10 based on passenger information 1220.

The passenger information 1220 may include physical information including age, gender, height and weight, etc. of the passenger, a license holding period after obtaining a driver's license, a disability status, and the like. In addition, the passenger information 1220 may further include an application usage history of the passenger.

The processor 261 may reinforce the artificial neural network model using the application usage history of the passenger as learning data. The vehicle 10 may provide the passenger 1210 with an application optimized for the passenger 1210 and/or an execution mode of the application by using the reinforcement learning artificial neural network model.

The passenger information 1220 may further include preferred application information. The preferred application information includes information about a preset feature function as a function that the passenger 1210 must include in the application. For example, when using navigation of the vehicle 10, a passenger A may wish to include a function of displaying navigation information in a 3D image in a navigation application. At this time, the passenger A may set in advance that a feature function called "3D image" is to be included in the "navigation application". As a result, when considering a change in an application execution mode according to a change in resource utilization and resource utilization, the processor 261 may control the "3D video" function of the "navigation application" not to be deleted and/or excluded.

Figure 12:
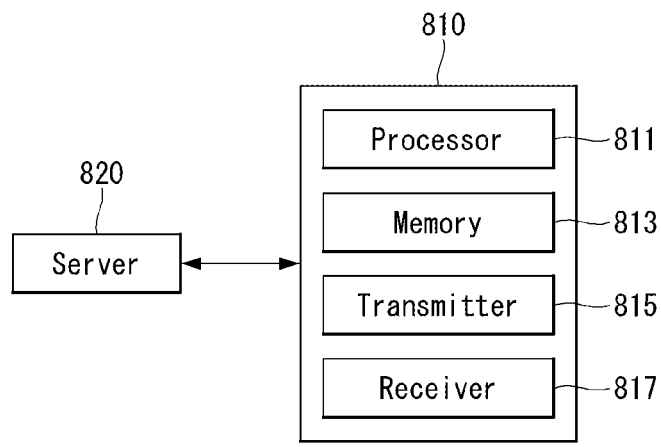
FIG. 12 is a block diagram illustrating a resource management system according to an embodiment of the present disclosure.

FIG. 12 is a block diagram illustrating a resource management system according to an embodiment of the present disclosure.

Referring to FIG. 12, the resource management system may include a server 820 and a resource management apparatus 810.

The server 820 may be operated by at least one operating entity. The server 820 may include a plurality of servers 820 operated by a plurality of operating entities. In addition, the device and server 820 may communicate with each other within at least one network. In addition, the network may include a local area network (LAN), a wide area network (WAN), a value added network (VAN), a mobile radio communication network, a satellite communication network, and a combination thereof, may be a comprehensive data communication network that allows each network component to communicate smoothly with each other, and may include wired internet, wireless internet, and mobile wireless communications network. The wireless communication may include, for example, wireless LAN (Wi-Fi), Bluetooth, Bluetooth low energy, Zigbee, Wi-Fi Direct (WFD), ultra-wideband (UWB), infrared data association (IrDA), Near Field Communication (NFC), and the like, but the wireless communication is not limited to this.

The server 820 according to an embodiment of the present disclosure may be an AI server. The AI server may refer to an apparatus for learning the artificial neural network using a machine learning algorithm or for using the learned artificial neural network. Here, the AI server may be composed of a plurality of servers to perform distributed processing, or may be defined as a 5G network. In this case, the AI server may be included as a part of the AI device 20 to perform at least some of the AI processing together.

The resource management apparatus 810 may include a processor 811, a memory 813, and a transceiver 815.

The processor 811 may execute at least one application that requires a predetermined resource during autonomous driving in the first mode, when the resource utilization required for the autonomous driving processor 811 exceeds a predetermined first threshold using the driving route information and an artificial neural network (ANN) model, and may switch from first mode of the at least one application to a second mode, wherein the at least one application is executed in a second mode requiring less resources than the first mode.

The processor 811 may input the driving route information into the artificial neural network model, and predict resource utilization related to an output value of the artificial neural network model.

The processor 811 may input the driving route information into the artificial neural network model, extract a feature from the driving route information, and input the extracted feature into the artificial neural network model.

The processor 811 may control an execution mode of the application so that the application is executed in a third mode requiring more resources than the first mode based on the predicted resource utilization decreases below a predetermined second threshold.

The processor 811 may request update information for other execution mode from an external server 820 based on no information for the other execution mode for switching execution mode of the at least one application.

The memory 813 may include at least one type of storage medium among a flash memory type, a hard disk type, a multimedia card micro type, a card type memory (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. An external device may be operated in connection with a web storage that performs a storage function of the memory on the internet.

In addition, the memory 813 may store an artificial neural network model received from the server 820.

A transmitter 815 and a receiver 817 constitute a transceiver. The transceiver may exchange signals with other communication-connected devices located outside the device. The communication unit may include at least one of a transmitting antenna, a receiving antenna, a radio frequency (RF) circuit and an RF element capable of implementing various communication protocols to perform communication.

Figure 13:
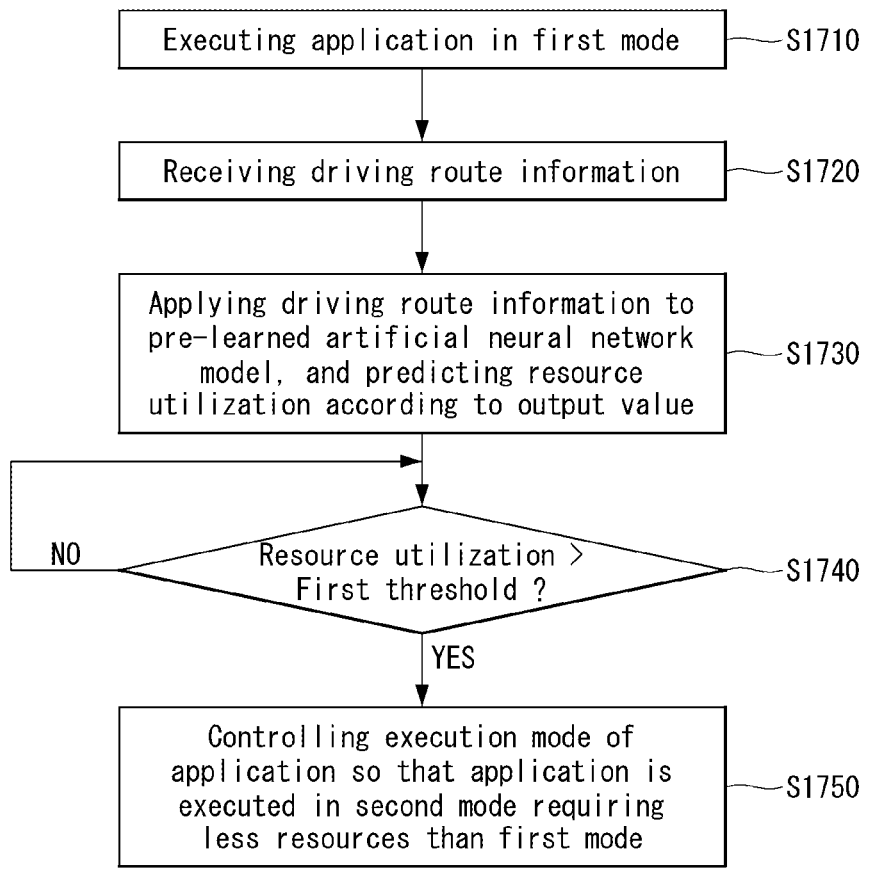
FIG. 13 is a flowchart of a resource management method according to an embodiment of the present disclosure.

FIG. 13 is a flowchart of a resource management method according to an embodiment of the present disclosure.

Referring to FIG. 13, the vehicle 10 may execute an application in a first mode (S1710).

The application may include an application used for the autonomous driving process of the vehicle 10. The application used in the autonomous driving process may include at least one of a navigation application, an object detection application, a voice recognition application, a multimedia application.

The vehicle 10 may receive driving route information by a receiver (S1720).

The driving route information refers to at least one driving route optimized from a starting point of the vehicle 10 to a destination. The driving route may include traffic information on a road as well as a moving distance. The driving route information may be generally generated by the server 820 and transmitted to the vehicle 10, but is not limited thereto, and may also be generated by the vehicle 10.

The driving route information may include at least one of a driving route to a destination, execution mode information of the application used in the autonomous driving process, a uniformity of a road surface located on the driving route, a curvature of a road, a number of surrounding objects, or a type of the surrounding objects.

The vehicle 10 may apply the driving route information to a pre-learned artificial neural network (ANN) model, and predict the resource utilization according to an output value of the artificial neural network model (S1730).

The processor may extract a feature from the driving route information. The processor may input the extracted feature into the pre-learned artificial neural network. The artificial neural network may receive the feature extracted from the driving route information as an input, and may be pre-learned to generate resource utilization as an output. The processor may analyze the output value using the artificial neural network and predict the resource utilization using the output value.

In addition, the vehicle 10 may process the AI process using the server 820 connected in communication with the 5G network. In this case, the processor may control the transceiver to receive the AI processed information from the AI processor. On the other hand, the processor may perform an initial access procedure with the 5G network in order to transmit data to the 5G network. The processor may perform the initial access procedure with the 5G network based on a synchronization signal block (SSB).

In addition, the processor may receive downlink control information (DCI) used for scheduling transmission of data through the transceiver from the network. At this time, the 5G network may include an AI processor or an AI system, and the AI system of the 5G network may perform AI processing based on the received sensing information. The AI processing may be performed by the processor of the vehicle 10 as well as by the external server 820 or the AI processor.

In a resource utilization prediction method according to an embodiment of the present disclosure, the AI processor 811 may input the driving route information into the artificial neural network model, and predict resource utilization related to the output value of the artificial neural network model. In addition, the AI processor 811 may extract a feature from the driving route information, and input the extracted feature into the artificial neural network model. In this case, the feature may include a vector extracted from the driving route information based on a pre-trained embedding model, wherein the embedding model is configured to vectorize the driving route information to an embedding vector related to the driving route information.

In the resource utilization prediction method according to an embodiment of the present disclosure, the predicted resource utilization may include location information. In detail, the resource utilization may be predicted in a form combined with the location information of the vehicle 10. For example, the resource utilization may vary depending on the location change of the vehicle 10 (see FIG. 20).

According to one embodiment of the present disclosure, the resource utilization of the vehicle 10 may vary depending on a driving mode. Since resources necessary for smooth execution of the application being used by the vehicle 10 need to be set differently depending on the driving mode, the vehicle 10 needs to set differently a point at which it is expected to change the application or the execution mode of the application depending on the driving mode.

For example, since the autonomous driving mode performs more driving processing such as detecting surrounding objects and setting an autonomous driving route, than the manual driving mode, the autonomous driving mode may require higher resource utilization than the manual driving mode.

For another example, the resource utilization of the vehicle 10 may be calculated lower in a group driving mode. In the group driving mode, the vehicle 10 may exchange the sensing data with the vehicle 10 in the group with a V2V message. That is, in the group driving mode, the resource utilization may be predicted differently according to the group driving information. The group driving information may include at least one of the number of the group driving vehicles 10, the location of the passenger vehicle 10 in the group, and a group leaving place of the vehicle 10 included in the group. The AI processor 811 may predict the resource utilization again every time the vehicle 10 leaves and enters in the group using the group driving information. The AI processor 811 may repeat the above-described control operation according to the re-predicted resource utilization.

By comparing the resource utilization with a predetermined first threshold, the vehicle 10 may switch from the first mode of the application to a second mode, wherein the application is executed in the second mode requiring less resources than the first mode based on the predicted resource utilization exceeds the first threshold (S1740, S1750).

As described above in S1730, the resource utilization may vary depending on a change in location of the vehicle 10, and the resource utilization may be combined with the location information of the vehicle 10. Therefore, the processor 811 may analyze the resource utilization combined with the location information, so that the processor 811 may determine a change point of the execution mode.

According to an embodiment of the present disclosure, the change point of the execution mode may be determined as a point at which the resource utilization exceeds the first threshold. In addition, the change point of the execution mode may be determined as a point at which the resource utilization decreases below the predetermined second threshold. In this case, the first and second thresholds may have the same value. Based on the resource utilization exceeds the first threshold, a delay may occur in an execution operation of at least one application required for the control operation of the vehicle 10.

In the resource management method according to an embodiment of the present disclosure, when all applications related to driving of the vehicle 10 are controlled to the execution mode that consumes the least resources, the first threshold may be defined as the sum of the resource utilization consumed by all the applications. In addition, in another embodiment of the present disclosure, when all applications related to the safety of the vehicle 10 are controlled to the execution mode that consumes the least resources, the first threshold may be defined as the sum of resource utilization consumed by all the applications.

According to an embodiment of the present disclosure, the vehicle 10 may determine the change point of the execution mode, and when the vehicle 10 passes the determined change point, the vehicle 10 may perform a control operation of changing an execution mode of the application. In this case, when the vehicle 10 passes the point where the resource utilization exceeds the first threshold, the vehicle 10 may switch from the first mode of the application to a second mode, wherein the currently executing application is executed in the second mode requiring less resources than the first mode. In addition, when the vehicle 10 passes the point where the resource utilization decreases below the predetermined second threshold, the vehicle 10 may control the execution mode of the application so that the currently executing application is executed in the third mode requiring more resources than the first mode.

In the resource management method according to an embodiment of the present disclosure, the processor 811 may generate a guide message before that the change in the application being executed or the execution mode of the application passes through a point where the predicted resource utilization is expected to reach the first threshold or the second threshold. For example, when the vehicle 10 approaches within a set distance from a point where the application or the execution mode of the application is expected to change, the processor 811 may generate a signal for controlling the vehicle 10 to output a guide message through an output device provided in the vehicle 10. In another example, when the vehicle 10 passes a point where the application or the execution mode of the application is expected to change, the processor 811 may generate a signal for controlling the vehicle 10 to output a message for guiding a change in the application or the execution mode of the application through the output device for a set time from the passing time. As such, one embodiment of the present disclosure has an advantage that the user can control or predict in advance the switching of the application or the execution mode of the application by giving specific conditions to a state where the change of the application or the execution mode of the application is expected.

In this case, the output device may include at least one of a display or a speaker.

FIG. 13 illustrates that the process of controlling the execution modes of the above-described applications in S1740 and S1750 is controlled in the vehicle 10, but is not limited thereto, and the external server 820 may also be performed by transmitting a control signal to the vehicle 10. Hereinafter, a resource management method of a specific resource management system will be described.

Figure 14:
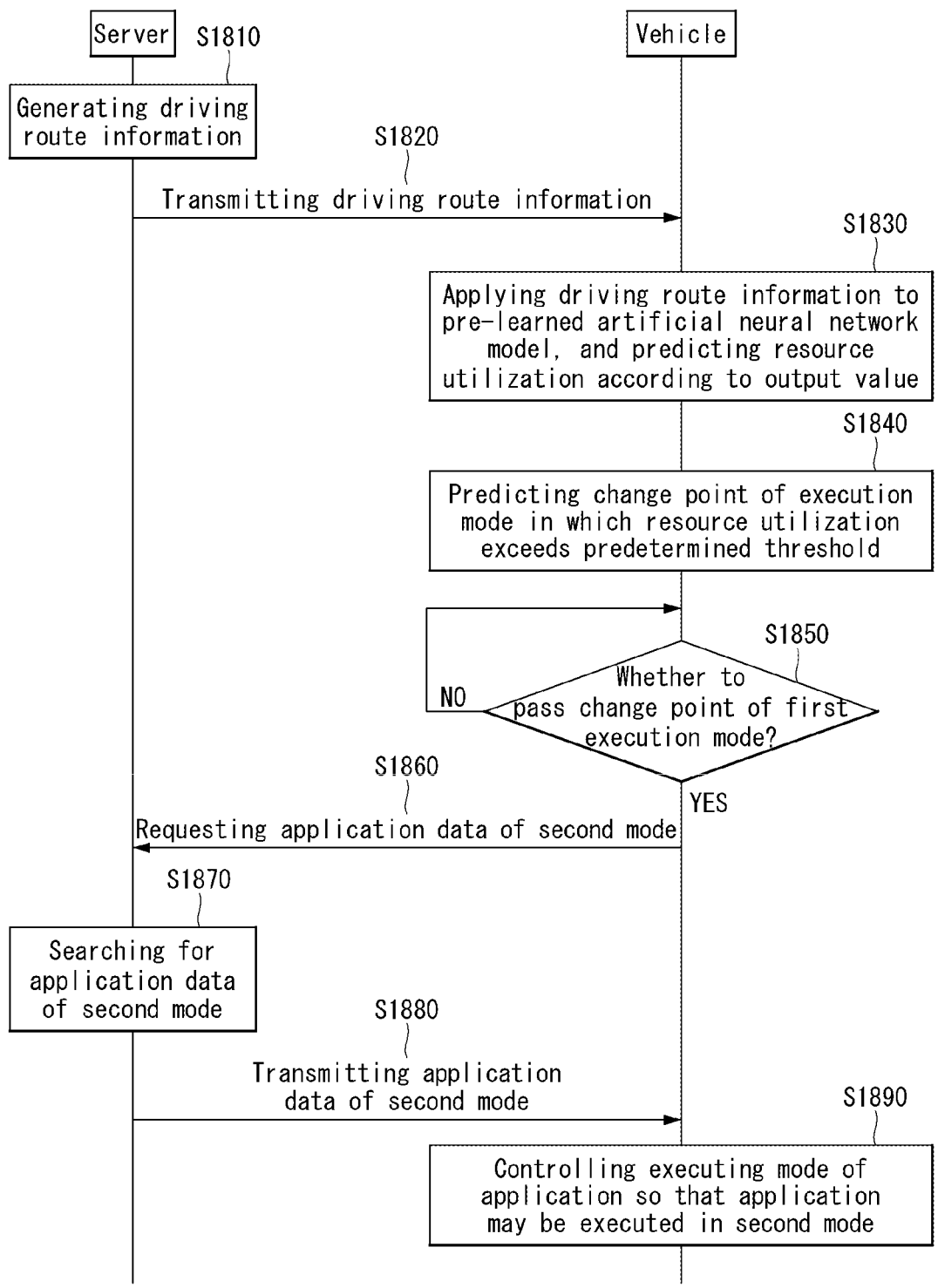
FIG. 14 is a sequence diagram of a resource management method according to an embodiment of the present disclosure.
Figure 15:
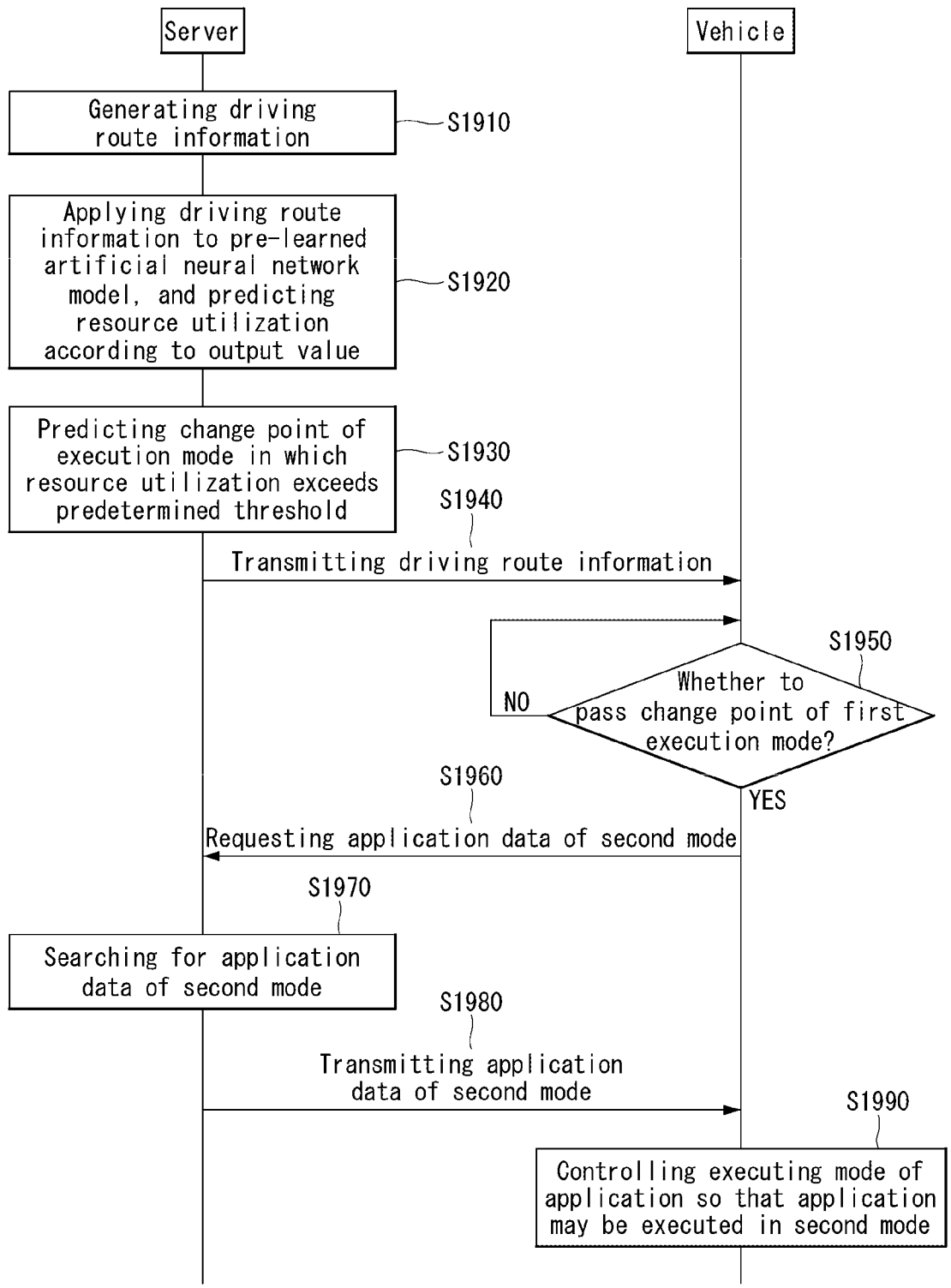
FIG. 15 is a sequence diagram of a resource management method according to another embodiment of the present disclosure.

FIGS. 14 and 15 are sequence diagrams illustrating an example of a resource management method of a resource management system. FIG. 14 is a diagram illustrating an example in which the AI processing for predicting resource utilization is processed in the vehicle 10, and FIG. 14 is a diagram illustrating an example in which the AI processing for predicting resource utilization is processed in a server. Hereinafter, FIGS. 14 and 15 omit content overlapping with what has already been described in FIG. 13.

FIG. 14 is a sequence diagram of a resource management method according to an embodiment of the present disclosure.

Referring to FIG. 14, the server 820 may generate driving route information (S1810).

The server 820 may transmit the driving route information to the vehicle 10 (S1820).

The vehicle 10 may apply the driving route information to a pre-learned artificial neural network model, and predict the resource utilization according to the output value (S1830).

At this time, the artificial neural network model is an artificial neural network model that is pre-learned to receive a feature value extracted from the driving route information as an input, and predict the resource utilization as an output value.

According to one embodiment of the present disclosure, learning of the artificial neural network model may be performed at the server 820. The server 820 may learn the artificial neural network model by labeling monitoring information received from the vehicle 10. That is, learning data of the artificial neural network model may be composed of a data set of the driving route information and the monitoring information.

At this time, the learning of the artificial neural network model may be performed by supervised learning of the regression method. In addition, the artificial neural network model may be learned as an artificial neural network model for predicting resource utilization of the vehicle 10 using the training data set composed of inputting of the location on the map of the vehicle 10 as the learning data used for learning outputs resources consumed while the vehicle 10 travels on a specific place on the map.

The server 820 may transmit the learned artificial neural network model to the vehicle 10, and the vehicle 10 may store the received artificial neural network model in memory and use it for later AI processing.

The vehicle 10 may predict a change point of an execution mode of the application in which the resource utilization is expected to exceed a predetermined first threshold (S1840).

When the vehicle 10 passes the change point of the execution mode of the application, the vehicle 10 starts an operation of controlling the execution mode of the application to be changed (S1850).

The vehicle 10 may request the application data of the second mode from the server 820 so that the application can be executed in the second mode, and the server 820 may search for the application data of the second mode in response to the request (S1860, S1870).

A message for requesting the application data of the second mode may include allowable resource information for the vehicle 10. The allowable resources for the vehicle 10 may be defined as allowed resources. That is, the server 820 may search for the application data of the second mode of the vehicle 10 based on the allowable resource information of the vehicle 10.

In addition, the message for requesting the application data of the second mode may further include information about a feature function preset by the passenger 1210 as a function that must be included in the application. When the server 820 receives a message including the feature function, the server 820 preferentially searches for an application including the feature function.

The server 820 may search for the application data of the second mode based on at least one of an OS, a type of application, a feature function, or an allowed resource. For example, it may be assumed that the vehicle 10 (i) uses the OS of Company A, (ii) receives a message to control the execution mode of the navigation application, and includes (iii) the "3D video" function as a feature function, and (iv) the GPU, CPU, memory, and space values as allowable resources of the vehicle 10.

At this time, the server 820 may (i) use the OS of Company A, (ii) transmit data controlling the execution mode of the navigation application, (iii) the execution mode included in the data may include a "3D video" function, and (iv) request a resource within the allowable resource range of the vehicle 10.

The application data stored in the server 820 may have a tag about an OS, a type of an application, a feature function, and an allowable resource, and may be searched according to (i) the OS, (ii) the application type, (iii) the feature function, and (iv) an order of the allowable resource based on the tag.

The server 820 may transmit the application data of the second mode to the vehicle 10 (S1880).

At this time, the application data of the second mode may exist 1 or 2 or more. That is, the application data of two or more second modes may be searched, and the searched application of the second mode may be transmitted.

According to an embodiment of the present disclosure, at this time, the vehicle 10 may select any one of a plurality of received application data of the second mode. The processor 811 may display two or more application data received through a display provided in the vehicle 10. The processor 811 may control an execution mode of the application using application data selected in response to a touch input received through a touch screen provided in the display.

According to another embodiment of the present disclosure, the vehicle 10 may automatically select any one of the plurality of received application data of the second mode. The vehicle 10 may analyze the searched application data, weight the number of functions possessed, the required resources, and may control an application capable of implementing a large number of functions with a small number of resources to be located at a high priority. The vehicle 10 may select the application data located at the highest priority and control the execution mode according to the selected application.

The vehicle 10 may control the application being executed in the first mode to be executed in the second mode by using the received application data of the second mode (S1890).

FIG. 15 is a sequence diagram of a resource management method according to another embodiment of the present disclosure. Unlike FIG. 18, FIG. 15 may perform AI processing for predicting resource utilization in the server 820 (or 5G network).

The processor 811 of the vehicle 10 may control the communication module to transmit the driving route information to the AI processor 811 included in the 5G network. In addition, the processor 811 may control the communication module to receive AI processed information from the AI processor 811.

In detail, the processor 811 may perform an initial access procedure with the 5G network to transmit and receive at least one of location information of the vehicle 10 in the 5G network, a second application data request message, or a second application data. The processor 811 may perform the initial access procedure with the 5G network based on a synchronization signal block (SSB).

The processor 811 may receive downlink control information (DCI) used to schedule transmission of at least one of the location information of the vehicle 10 or the second application data request message via the communication module from a network.

The processor 811 may transmit the location information of the vehicle 10 or the second application data request message to the 5G network based on the DCI.

In addition, the location information of the vehicle 10 or the second application data request message may be transmitted to the 5G network through the PUSCH, and the SSB and the DM-RS of the PUSCH may be QCL for QCL type D.

In the following disclosure, with reference to FIG. 15, a method of predicting resource utilization at a specific location of the vehicle 10 by AI processing in the server 820 or 5G network will be described below. Among the resource management methods described later in FIG. 15, technical features common to those of FIG. 14 will be omitted.

Referring to FIG. 15, the server 820 may generate driving route information (S1910).

The vehicle 10 may apply the driving route information to a pre-learned artificial neural network model, and may predict resource utilization according to an output value (S1920).

The vehicle 10 may predict a change point of the execution mode of the application in which the resource utilization is expected to exceed a predetermined first threshold (S1930).

The server 820 may transmit the driving route information to the vehicle 10 (S1940).

When the vehicle 10 passes the change point of the execution mode of the application, the vehicle 10 starts an operation of controlling the execution mode of the application to be changed (S1950).

The vehicle 10 may request the application data of the second mode from the server 820 so that the application can be executed in the second mode (S1960).

The server 820 may search for the application data of the second mode (S1970).

As described above in FIG. 18, the server 820 may search for the execution mode data of the application or another application available to the vehicle 10 based on a message for requesting the application data of the second mode received from the vehicle 10.

The message for requesting the application data of the second mode may include allowable resource information for the vehicle 10. The allowable resource for the vehicle 10 may be defined as allowed resource. That is, the server 820 may search for the application data of the second mode of the vehicle 10 based on the allowable resource information of the vehicle 10.

In addition, the message for requesting the application data of the second mode may further include information about a feature function preset by the passenger 1210 as a function that must be included in the application. When the server 820 receives a message including the feature function, the server 820 preferentially searches for an application including the feature function.

The server 820 may transmit the application data of the second mode to the vehicle 10 (S1980).

In an embodiment of the present disclosure, the application may be downloaded as a module unit and installed in the vehicle 10. The module unit may be implemented as a container module unit. The vehicle 10 may include at least one software container. In the following, the software container may be referred to as a container. One application may be stored in each container. In addition, different resources may be pre-allocated to each container. That is, the different resources are allocated to a plurality of containers included in the vehicle 10, and the containers may be controlled to store an appropriate application according to the allocated resources.

For example, the container may include a navigation container in which the navigation application is stored, a voice assistance container in which a voice recognition model is stored, a multimedia container used for multimedia playback, and the like.

The vehicle 10 may receive and store the application in units of modules from the 5G network. At this time, the vehicle 10 needs to improve the communication performance for smooth transmission and reception of the module, and a detailed solution will be described later with reference to FIG. 21.

The vehicle 10 may control the application being executed in the first mode to be executed in the second mode by using the received application data of the second mode (S1990).

Figure 16A:
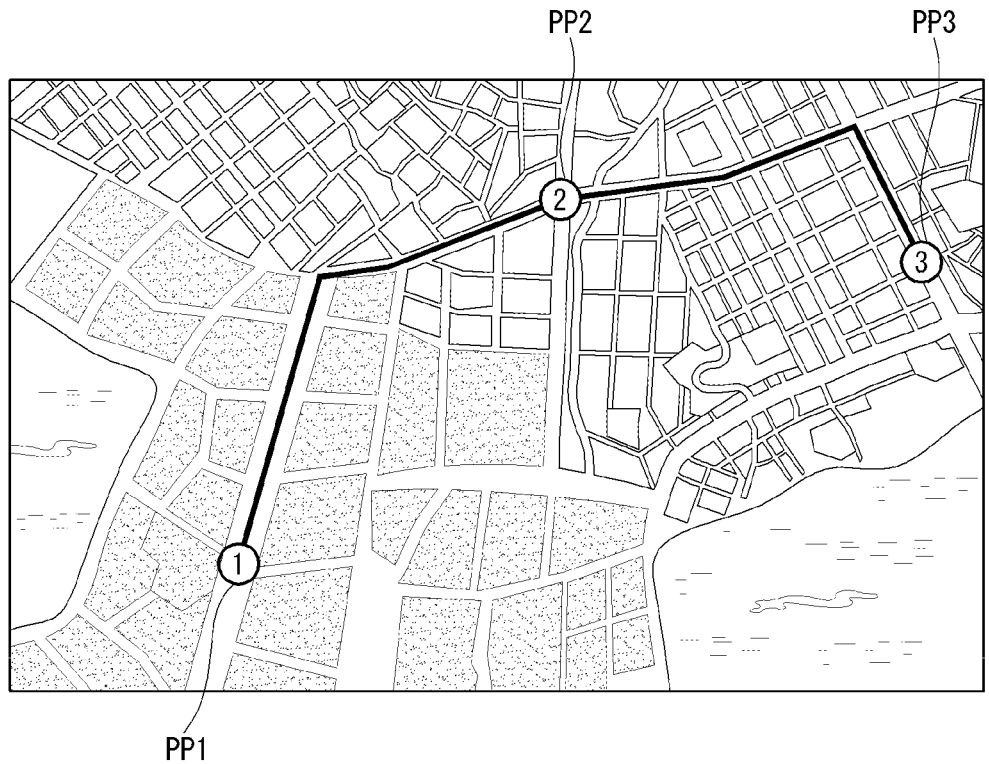
FIGS. 16A and B are diagrams illustrating a method of predicting an application execution mode change point according to an embodiment of the present disclosure.
Figure 16B:
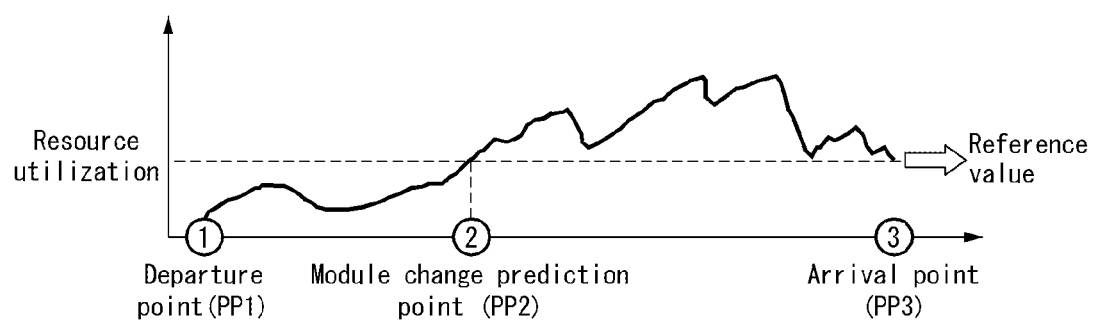

FIGS. 16A and 16B are diagrams illustrating a method of predicting an application execution mode change point according to an embodiment of the present disclosure. In the following disclosure, "reference value" or "threshold value" is a configuration that can be used interchangeably.

Referring to FIG. 16A, the vehicle 10 may form a driving route starting from a first point PP1 and going to a third point PP3 via a second point PP2. Referring to FIG. 16B, the vehicle 10 may predict resource utilization from a departure point to an arrival point. In this case, the resource utilization may be predicted using the artificial neural network model described above.

For example, the first point PP1 represents an agricultural land on the map. At the first point PP1, the vehicle 10 may predict the resource utilization based on at least one of execution mode information of the application used in an autonomous driving process, a uniformity of a road surface located on the driving route, a curvature of a road, a number of surrounding objects, or a type of the surrounding objects. Specifically, at the first point PP1, it may be determined that the uniformity of the road surface is 'BAD', the curvature of the road surface is 'GOOD', the number of surrounding objects is 'LOW' or 'X (where X is a natural number)', the type of the surrounding objects is 'TREE'.

The processor 811 may apply the above-described input data to the artificial neural network model, and predict the resource utilization from an output value output as a result of the application. The resource utilization may increase in proportion to the number of surrounding objects. The resource utilization may vary depending on the type of surrounding objects, and may increase especially with more movable objects. The resource utilization may decrease as the road surface becomes uniform. The resource utilization may increase as the curvature of the road increases.

When the vehicle 10 reaches the second point PP2 based on the change pattern of resource utilization, the vehicle entered the city on the map, and it can be seen that the resource utilization gradually increases as the number of surrounding objects increases. Thereafter, since the autonomous driving process continues in the city while moving from the second point PP2 to the third point PP3, the resource utilization is consistently higher than the reference value (or threshold).

Referring to FIG. 16B, since the resource utilization from the first point to the second point is lower than the reference value, the vehicle 10 may determine that an application change is not necessary. However, the resource utilization of the vehicle 10 at the second point may be predicted to exceed the threshold. That is, the vehicle 10 may start the application change process at the second point. Then, since the resource utilization from the second point to the third point is determined to exceed the threshold, the vehicle 10 no longer performs the application change process.

Figure 17:
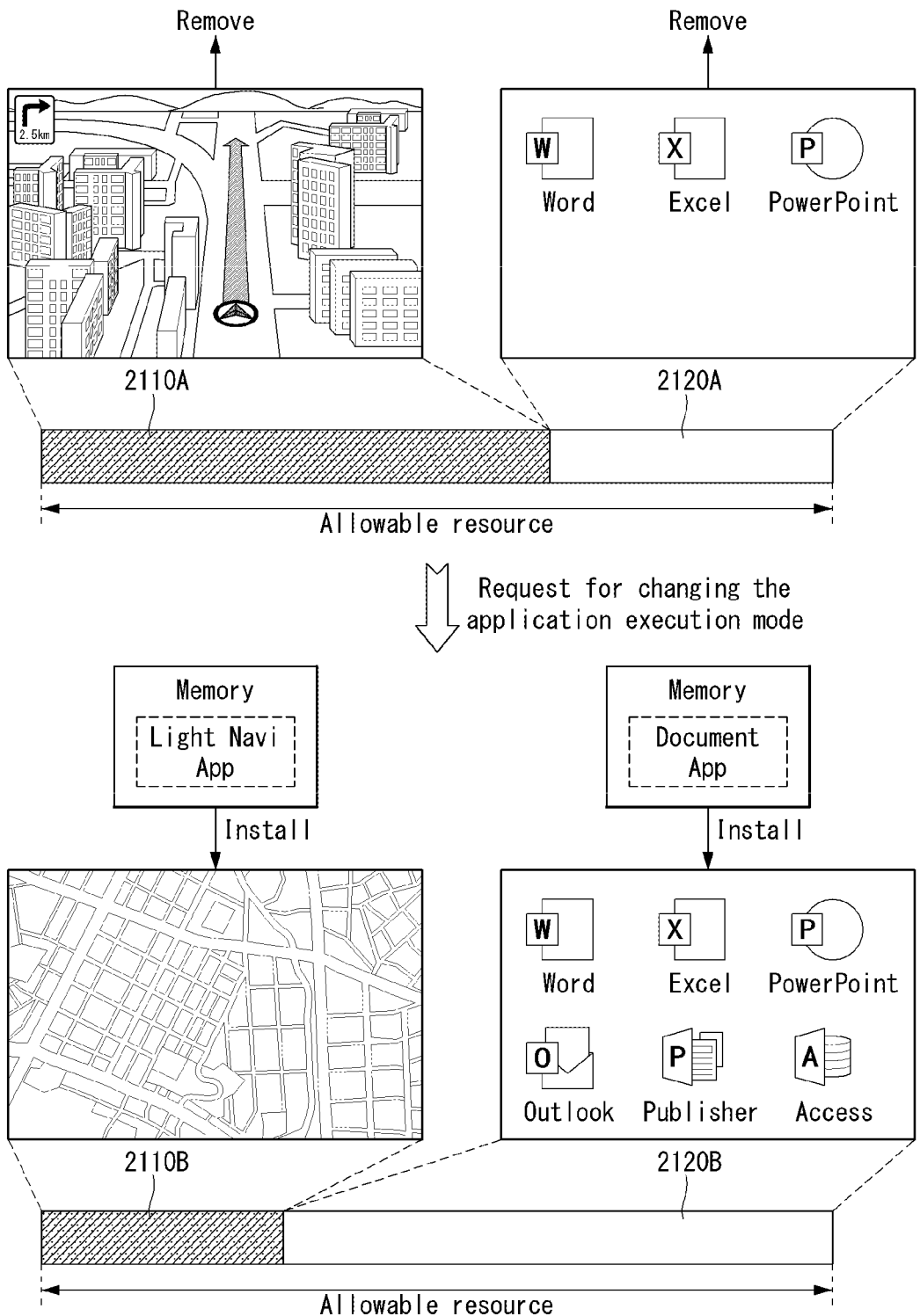
FIG. 17 is a diagram illustrating a process of controlling an execution mode of an application according to a user's preference according to an embodiment of the present disclosure.

FIG. 17 is a diagram illustrating a process of controlling an execution mode of an application according to a passenger's preference according to an embodiment of the present disclosure.

Referring to FIG. 17, a first navigation application displays building and road information including 3D images, and a first document application includes Word, Excel, and PowerPoint.

In this case, an initial resource allocated to the navigation application may be referred to as a first resource 2110A, and an initial resource allocated to the document application may be referred to as a second resource 2120A. Looking at the resource utilization of the vehicle 10, the first resource 2110A has a larger value than the second resource 2120A.

When the passenger 1210 presets to include a specific function in a specific application or sets to include the specific function, the vehicle 10 may control the specific application to be controlled in the execution mode including the specific function.

For example, the vehicle 10 may request the server for a document application of a second execution mode having more various functions than a document application of a first execution mode currently being executed. According to the embodiment of FIG. 17, unlike the document application of the first execution mode, the vehicle 10 may request the server for data about the second execution mode further including Outlook, Publisher, and Access.

At this time, the first resource 2110A is changed to a third resource 2110B, and the second resource 2120A is changed to a fourth resource 2120B. The sum of the first and second resources 2110A and 2120A is the same as the sum of the third and fourth resources 2110B and 2120B.

Figure 18:
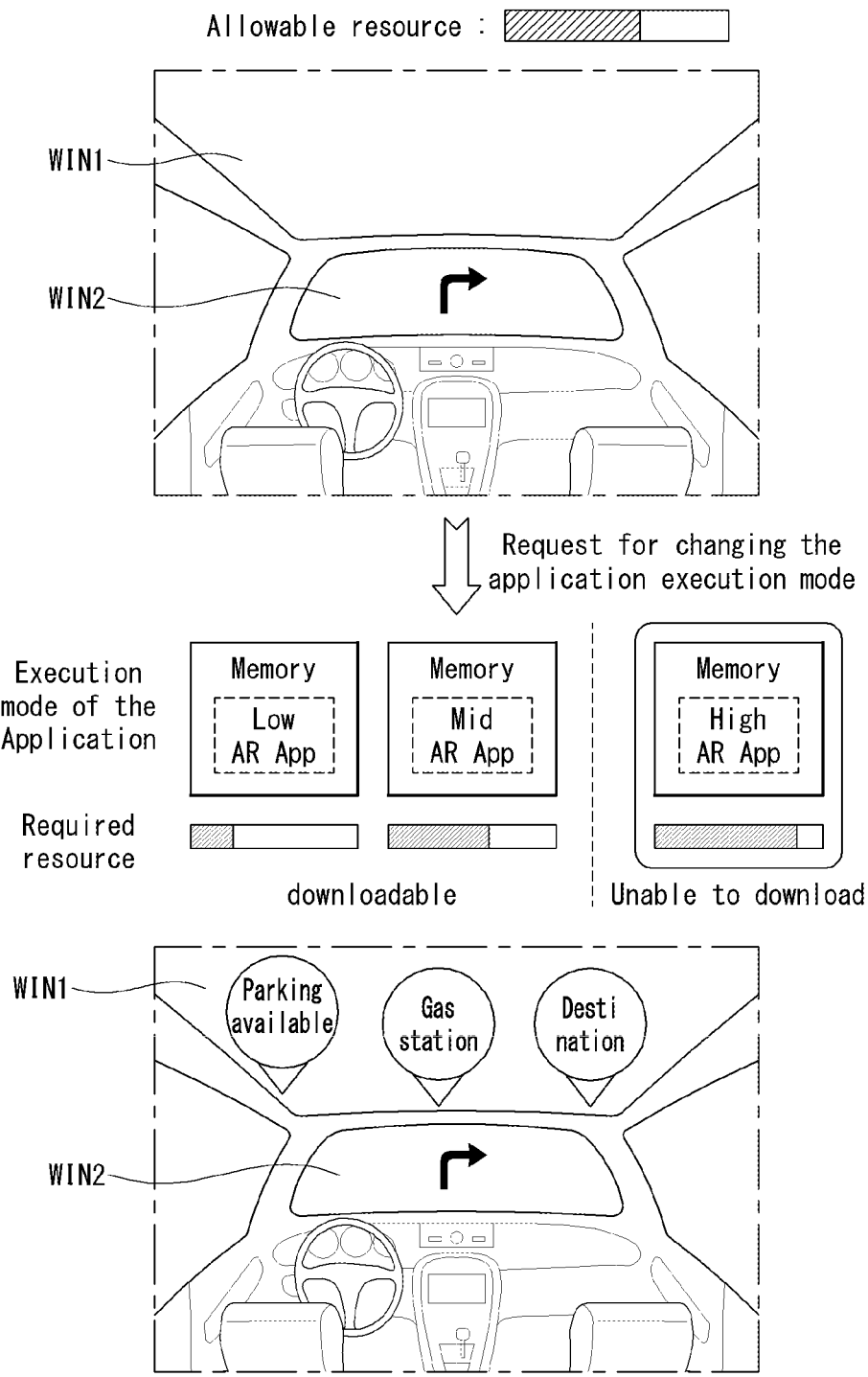
FIG. 18 is a diagram illustrating a process of selecting an execution mode of an application according to an embodiment of the present disclosure.

FIG. 18 is a diagram illustrating a process of selecting an execution mode of an application according to an embodiment of the present disclosure.

As described above, the processor 811 may determine the resource utilization that is predicted to be consumed by the vehicle 10 on the driving route based on the driving route information. The processor 811 may determine an application or an execution mode of the application that the current vehicle 10 may use by comparing the predicted resource utilization with the resource state of the current vehicle 10.

In this case, the processor 811 may determine that an application that is currently available to the vehicle 10 may be available, and that an application that is not currently available to the vehicle 10 may be unavailable. The availability of the application according to the resource state of the vehicle 10, as described above, may be determined by comparing the resources currently available to vehicle 10 with the resources currently in use.

The vehicle 10 of FIG. 18 may include at least one of a first window WIN1 or a second window WIN2. The first window WIN1 may be located on the upper side of the vehicle 10, and the second window WIN2 may be located on the front of the vehicle 10. AR technology may be coupled to the first and second windows WIN1 and WIN2. That is, the first and second windows WIN1 and WIN2 may be implemented as transparent displays and used as a means for implementing augmented reality. Navigation information may be displayed in the first window WIN1 or the second window WIN2.

The navigation information may display different information according to the execution mode of the navigation application.

For example, the navigation application may be executed in an execution mode having at least one of low performance, mid performance, and high performance. The higher the performance of the navigation application, the greater the number of information that can be output through the navigation device. High performance navigation applications may have better graphical representation displayed through the display, or more variety of road information that can be guided through the display than low performance navigation applications. However, the higher the performance of the navigation application, the greater the required resources. Therefore, the high performance navigation application may be determined to be unavailable to download in view of the current resource state of the vehicle 10.

At this time, availability of a specific application execution mode of the vehicle 10 may be determined by comparing the available resources with the resources required by the specific application execution mode. The processor 811 may compare the available resources with the resources required by the specific application execution mode, and when the resources required by the specific application execution mode are larger than the available resources, the processor 811 may determine that the application is not available.

Referring to FIG. 18, since the high performance navigation applications require higher resources than the available resources to the vehicle 10, the processor 811 classifies them as an application that cannot be downloaded, and classifies low performance and medium performance applications into downloadable applications.

Figure 19:
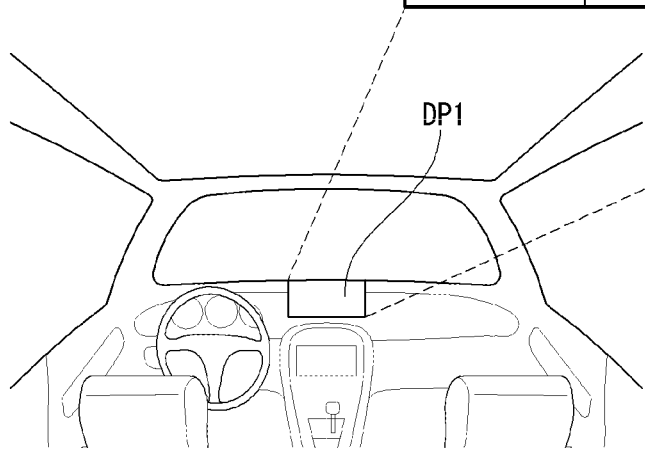

FIGS. 19 and 20 are diagrams illustrating a process of selecting any one of a plurality of applications and downloading and installing it.

As described above with reference to FIGS. 18 and 19, the server may search for the application data of the second mode of the vehicle 10 based on the allowable resource information of the vehicle 10. At this time, the vehicle 10 may receive a search result of the application second mode from the server.

According to an embodiment of the present disclosure, the search result of the second mode may include a plurality of search results. For example, in the case of FIGS. 22 and 19, mode A, mode B, and mode C may be received as the search result of the second mode.

In this case, the vehicle 10 may identify an application that the vehicle 10 may use according to the resource state of the current vehicle 10. For example, in the mode A, since the required resource is large, the current vehicle 10 cannot execute an application in the mode A, and may execute the application in the mode B or the mode C.

In this case, the vehicle 10 may display the search result through the display DP1 provided in the vehicle 10. The search result may include not only the execution mode of the application but also a resource required to execute the application in the searched execution mode, and whether an application can be executed in the execution mode according to the resource utilization of the current vehicle 10.

According to an embodiment of the present disclosure, when the vehicle 10 receives a touch input for any one of at least one execution mode displayed through a display, the vehicle 10 may download the received application (see FIG. 20).

However, receiving a touch input for selecting any one of a plurality of execution modes while driving the vehicle 10 may cause a safety accident to the passenger 1210 when driving in the manual driving mode. Thus, according to another embodiment of the present disclosure, when a plurality of execution modes are searched, the vehicle 10 may automatically select and download a specific execution mode.

In detail, the vehicle 10 may automatically select any one of the plurality of received application data of the second mode. The vehicle 10 may analyze the searched application data, weight the number of functions possessed, the required resources, and control an application capable of implementing many functions with small resources to be positioned at a high priority. The vehicle 10 may select the application data positioned at the highest priority, and control the execution mode according to the selected application.

Figure 21:
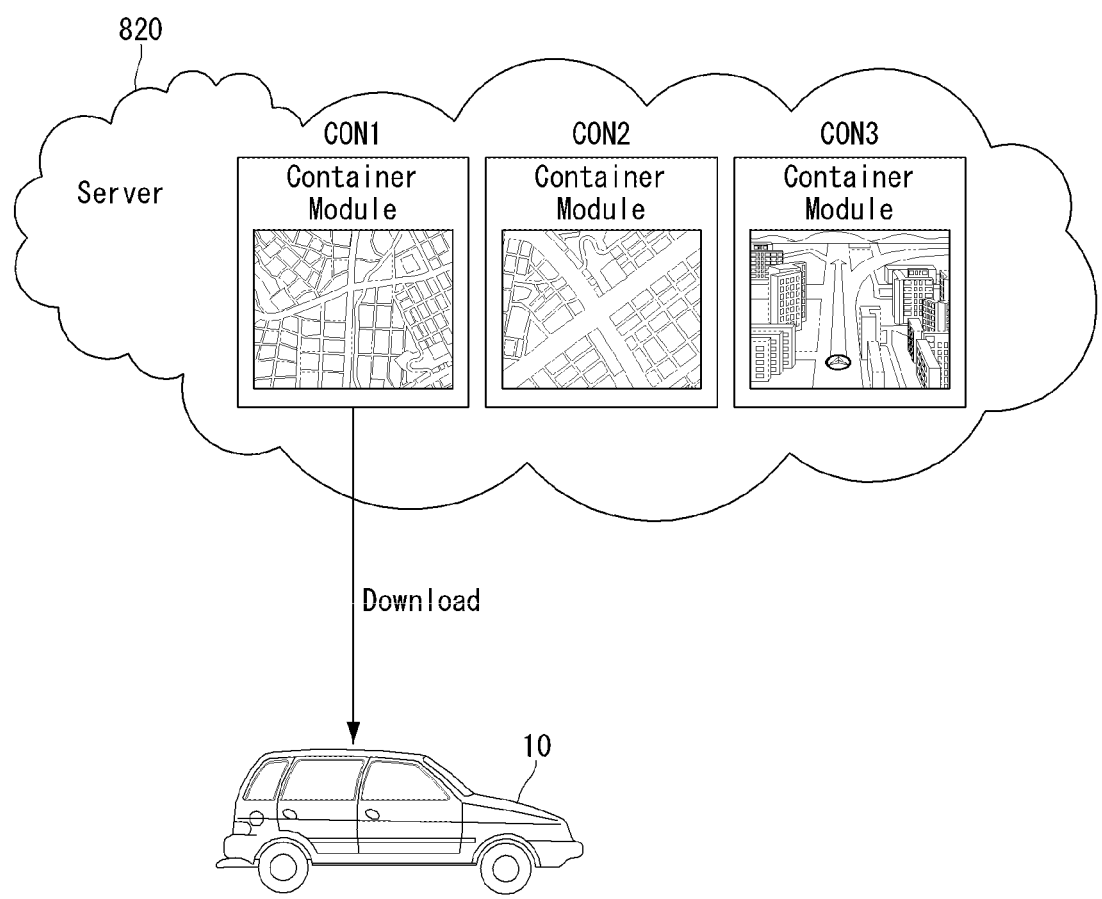
FIG. 21 is a diagram for explaining an application change method according to another embodiment of the present disclosure.

FIG. 21 is a diagram for explaining an application change method according to another embodiment of the present disclosure.

As described above in FIG. 15, the application may be downloaded as a module unit and installed in the vehicle 10. The module unit may be implemented as a container module unit. The vehicle 10 may include at least one software container. In the following, the software container may be referred to as a container. One application may be stored in each container. In addition, different resources may be pre-allocated to each container. That is, the different resources are allocated to a plurality of containers included in the vehicle 10, and the containers may be controlled to store an appropriate application according to the allocated resources.

For example, the container may include a navigation container in which the navigation application is stored, a voice assistance container in which a voice recognition model is stored, a multimedia container used for multimedia playback, and the like.

In an embodiment of the present disclosure, in order to establish a communication connection with the server 820, the vehicle 10 may request server information for establishing a communication connection with the server 820 from the base station, and receive server information related to one or more servers 820 connected to the base station. The server information may include traffic information of the server 820, and the vehicle 10 may determine whether or not to communicate with the server 820 depending on the traffic state.

In more detail, the base station and the server 820 on the driving route on which the vehicle 10 drives may be located in plural numbers. The vehicle 10 may monitor base stations that are accessible to the surroundings while driving, and receive server information that can be connected to each base station. The server information may include at least one of an IP address of the server, base station information of the server, current occupation traffic or main processing function information of the server.

In addition, the vehicle 10 may search for and determine an appropriate server 820 for each processing function required by the vehicle 10 based on the received server information. For example, the vehicle 10 may check the server 820 in which the processing function required by the vehicle 10 and the main processing function match. As another example, the vehicle 10 may select a server having the lowest occupied traffic among servers that have been verified to be suitable for the main processing function.

At this time, if there is no server suitable for the main processing function, or if all occupied traffic is the maximum, the vehicle 10 may process data using its own application resources without using the server.

The vehicle 10 may transmit data to the selected server and receive a processed result. In the present disclosure, the vehicle 10 may receive data in the second mode of another application or the currently executing application.

In addition, in the method of changing an application according to an embodiment of the present disclosure, the vehicle 10 may change a type of a container module to be received according to communication specification or communication quality with the server 820. The communication specification may be assessed differently depending on traffic density, speed and presence or absence of obstacles. In one example, the capacity of the container module, which can evaluate the communication specification with the server 820, and receive it in proportion to the communication speed as a result of the evaluation, may be larger. In contrast, the capacity of the container module, which can receive it in inverse proportion to the communication speed, may be reduced.

In addition, when the communication specification is determined to be below a predetermined threshold, the vehicle 10 may stop changing the application for resource management. At this time, since the vehicle 10 cannot receive the container module from the server 820, the vehicle 10 may manage the resources of the vehicle 10 in a manner of controlling an application stored in the vehicle 10 or an execution mode of the application.

Referring to FIG. 21, the server 820 may search for at least one application or an execution mode of an application in response to a request from the vehicle 10. At this time, the searched application or the execution mode of the application is searched based on available resources of the vehicle, as described above. The searched application or the execution mode of the application may be provided in one container module. For example, different navigation applications may be stored in a first container CON1, a second container CON2, and a third container CON3. The searched application may be transmitted to the vehicle 10 in a state provided in the container module. The container module may also store metadata corresponding to a specific function of the vehicle. For example, the metadata may include navigation-related metadata, multimedia metadata, and the like. The vehicle 10 may control a specific container module to be recorded in a pre-allocated storage space of the vehicle 10 using the metadata. As such, the vehicle 10 may install an application included in the received container module as an application corresponding to a specific function of the vehicle 10.

The above-described present invention can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

What is claimed is:

1. A method for managing a resource in a vehicle, comprising:
    executing at least one application requiring a resource in a first mode, the at least one application associated with an autonomous driving process of the vehicle;
    obtaining driving route information;
    obtaining, from a position data generation device disposed at the vehicle, location information providing a current location of the vehicle;
    predicting resource utilization expected to be required in the first mode by using the driving route information and the location information;
    determining a specific point for switching from the first mode executing the at least one application to a second mode;
    receiving, from a server, a container module including application data of the second mode that includes information related to the at least one application to be operated in the vehicle; and
    installing the received container module,
    wherein the at least one application is executed in the second mode requiring less resources than being executed in the first mode.

2. The method of claim 1, wherein predicting resource utilization includes:
    applying the driving route information and the location information to an artificial neural network (ANN) model; and
    predicting the resource utilization from an output value of the artificial neural network model.

3. The method of claim 2, wherein predicting resource utilization includes:
    inputting the driving route information and the location information into the artificial neural network model; and
    predicting resource utilization related to the output value of the artificial neural network model.

4. The method of claim 3, wherein inputting the driving route information into the artificial neural network model includes:
    extracting a feature from the driving route information; and
    inputting the extracted feature into the artificial neural network model.

5. The method of claim 4,
    wherein the extracted feature includes a vector that is extracted from the driving route information based on a pre-trained embedding model, and wherein the pre-trained embedding model is configured to vectorize the driving route information to an embedding vector related to the driving route information.

6. The method of claim 2, further comprising:
applying an application usage history of passenger to the artificial neural network model as learning data.

7. The method of claim 1, wherein the driving route information includes at least one of a driving route to a destination, execution mode information of the at least one application used in the autonomous driving process, a uniformity of a road surface located on the driving route, a curvature of a road, a number of surrounding objects, or a type of the surrounding objects.

8. The method of claim 1, wherein the at least one application comprises at least one of a navigation application, an object detection application, a voice recognition application, or a multimedia application.

9. The method of claim 1, wherein the server is configured to search for the application data based on allowable resource information for the vehicle.

10. The method of claim 1, wherein the server is configured to search for the at least one application including a feature function that is included in the application data.

11. The method of claim 1, wherein the container module further includes metadata corresponding to a specific function of the vehicle, and
wherein installing the received container module comprises installing the at least one application included in the received container module as an application corresponding to the specific function of the vehicle.

12. The method of claim 1, further comprising:
determining a value of communication specification based on at least one of a traffic density, speed, or a presence or absence of obstacles,
wherein determining the specific point comprises, based on a determination that the value of communication specification has passed a predetermined threshold, determining a current time as the specific point.

13. The method of claim 1,
wherein determining the specific point comprises determining a point at which the resource utilization exceeds a first threshold as the specific point,
wherein installing the received container module comprises switching, based on the vehicle passing the specific point, the execution mode from the first mode executing the at least one application to the second mode.

14. An apparatus for managing a resource in a vehicle, comprising:
a transceiver configured to receive driving route information of the vehicle;
a position data generation device configured to provide location information providing a current location of the vehicle; and
a processor configured to:
execute at least one application requiring a resource in a first mode, the at least one application associated with an autonomous driving process of the vehicle,
predict resource utilization expected to be required in the first mode by using the received driving route information and the provided location information,
determine a specific point for switching from the first mode executing the at least one application to a second mode,
receive, from a server, a container module including application data of the second mode that includes information related to the at least one application to be operated in the vehicle, and
install the received container module,
wherein the at least one application is executed in the second mode requiring less resources than being executed in the first mode.

15. The apparatus of claim 14, wherein predicting resource utilization includes:
applying the driving route information and the location information to an artificial neural network model, and
predicting the resource utilization from an output value of the artificial neural network model.

16. The apparatus of claim 15, wherein predicting resource utilization includes:
inputting the driving route information and the location information into the artificial neural network model, and
predicting resource utilization related to the output value of the artificial neural network model.

17. The apparatus of claim 16, wherein inputting the driving route information into the artificial neural network model includes:
extracting a feature from the driving route information, and
inputting the extracted feature into the artificial neural network model.

18. The apparatus of claim 17,
wherein the extracted feature includes a vector that is extracted from the driving route information based on a pre-trained embedding model, and
wherein the pre-trained embedding model is configured to vectorize the driving route information to an embedding vector related to the driving route information.

19. The apparatus of claim 15, wherein the driving route information includes at least one of a driving route to a destination, execution mode information of the at least one application used in the autonomous driving process, a uniformity of a road surface located on the driving route, a curvature of a road, a number of surrounding objects, or a type of the surrounding objects.

20. The apparatus of claim 14, wherein the at least one application comprises at least one of a navigation application, an object detection application, a voice recognition application, or a multimedia application.

21. The apparatus of claim 14, wherein the server is configured to search for the application data based on allowable resource information for the vehicle.

22. The apparatus of claim 14, wherein the server is configured to search for the at least one application including a feature function that is included in the application data.

23. The apparatus of claim 14, wherein the container module further includes metadata corresponding to a specific function of the vehicle, and
wherein installing the received container module comprises installing the at least one application included in the received container module as an application corresponding to the specific function of the vehicle.

24. The apparatus of claim 14, wherein the processor is further configured to:
determine a value of communication specification based on at least one of a traffic density, speed, or a presence or absence of obstacles; and
wherein determining the specific point comprises, based on a determination that the value of communication specification has passed a predetermined threshold, determining a current time as the specific point.

25. The apparatus of claim 14,
wherein determining the specific point comprises determining a point at which the resource utilization exceeds a first threshold as the specific point, and
wherein installing the received container module comprises switching, based on the vehicle passing the specific point, the execution mode from the first mode executing the at least one application to the second mode.

\* \* \* \* \*